(12) United States Patent
Frenne et al.

(10) Patent No.: US 9,692,569 B2
(45) Date of Patent: Jun. 27, 2017

(54) METHOD AND APPARATUS FOR CONTROL CHANNEL RESOURCE ALLOCATIONS IN CONSTRAINED AND UNCONSTRAINED SUBFRAMES IN A WIRELESS COMMUNICATION NETWORK

(71) Applicant: Telefonaktiebolaget L M Ericsson (publ), Stockholm (SE)

(72) Inventors: Mattias Frenne, Uppsala (SE);
Jung-Fu Cheng, Fremont, CA (US);
Johan Furuskog, Stockholm (SE);
Havish Koorapaty, Saratoga, CA (US);
Daniel Larsson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 378 days.

(21) Appl. No.: 14/116,886

(22) PCT Filed: Sep. 19, 2013

(86) PCT No.: PCT/SE2013/051095
§ 371 (c)(1),
(2) Date: Nov. 11, 2013

(87) PCT Pub. No.: WO2014/163546
PCT Pub. Date: Oct. 9, 2014

(65) Prior Publication Data
US 2014/0301287 A1    Oct. 9, 2014

Related U.S. Application Data

(60) Provisional application No. 61/808,037, filed on Apr. 3, 2013.

(51) Int. Cl.
*H04L 5/00* (2006.01)
*H04L 1/00* (2006.01)

(52) U.S. Cl.
CPC .......... *H04L 5/0048* (2013.01); *H04L 1/0038* (2013.01); *H04L 5/0007* (2013.01)

(58) Field of Classification Search
None
See application file for complete search history.

(56) References Cited

U.S. PATENT DOCUMENTS

| 2013/0039284 A1* | 2/2013 | Marinier et al. ............... 370/329 |
| 2013/0182664 A1* | 7/2013 | Chen et al. .................... 370/329 |
| 2013/0308596 A1* | 11/2013 | Nam ................. H04W 72/0446 370/330 |

OTHER PUBLICATIONS

Author Unknown, "ePDCCH Blind decoding," Ericsson, ST-Ericsson; 3GPP TSG-RAN WG1 #71; R1-125234; Nov. 12-16, 2012. pp. 1-5. New Orleans, Louisiana, United States of America.

(Continued)

*Primary Examiner* — Fan Ng
(74) *Attorney, Agent, or Firm* — Murphy, Bilak & Homiller, PLLC

(57) ABSTRACT

Among other advantageous aspects, the teachings herein provide network-side and device-side apparatuses and methods that preserve normal Resource Element (RE) aggregation levels for the transmission of Enhanced Physical Downlink Control Channels (EPDCCHs) in "constrained" subframes, where "constrained" refers to any subframe having fewer REs available for EPDCCH usage within a base set of PRB pairs than are available in a "non-constrained" or "normal" subframe. Non-limiting examples of "constrained" subframes include special subframes in Time Division Duplex, TDD, operation, which comprise a downlink portion that is abbreviated to accommodate an included uplink portion, along with a guard portion between them. Multimedia Broadcast Single Frequency Network, MBSFN, subframes represent another example of a constrained sub- (Continued)

frame, where only the first two OFDM symbols within the subframe are available for EPDCCH transmissions.

26 Claims, 22 Drawing Sheets

(56) References Cited

OTHER PUBLICATIONS

3rd Generation Partnership Project, "3GPP TS 21.101 V8.4.0 (Mar. 2012)," 3rd Generation Partnership Project; Technical Specification Group Services and System Aspects; Technical Specifications and Technical Reports for a UTRAN-based 3GPP system (Release 8). Mar. 2012. pp. 1-42.

3rd Generation Partniship Project, "3GPP TS 21.101 V11.0.0 (Mar. 2013)," 3rd Generation Partnership Project; Technical Specification Group Services and System Aspects; Technical Specifications and Technical Reports for a UTRAN-based 3GPP system (Release 11). Mar. 2013. pp. 1-44.

* cited by examiner

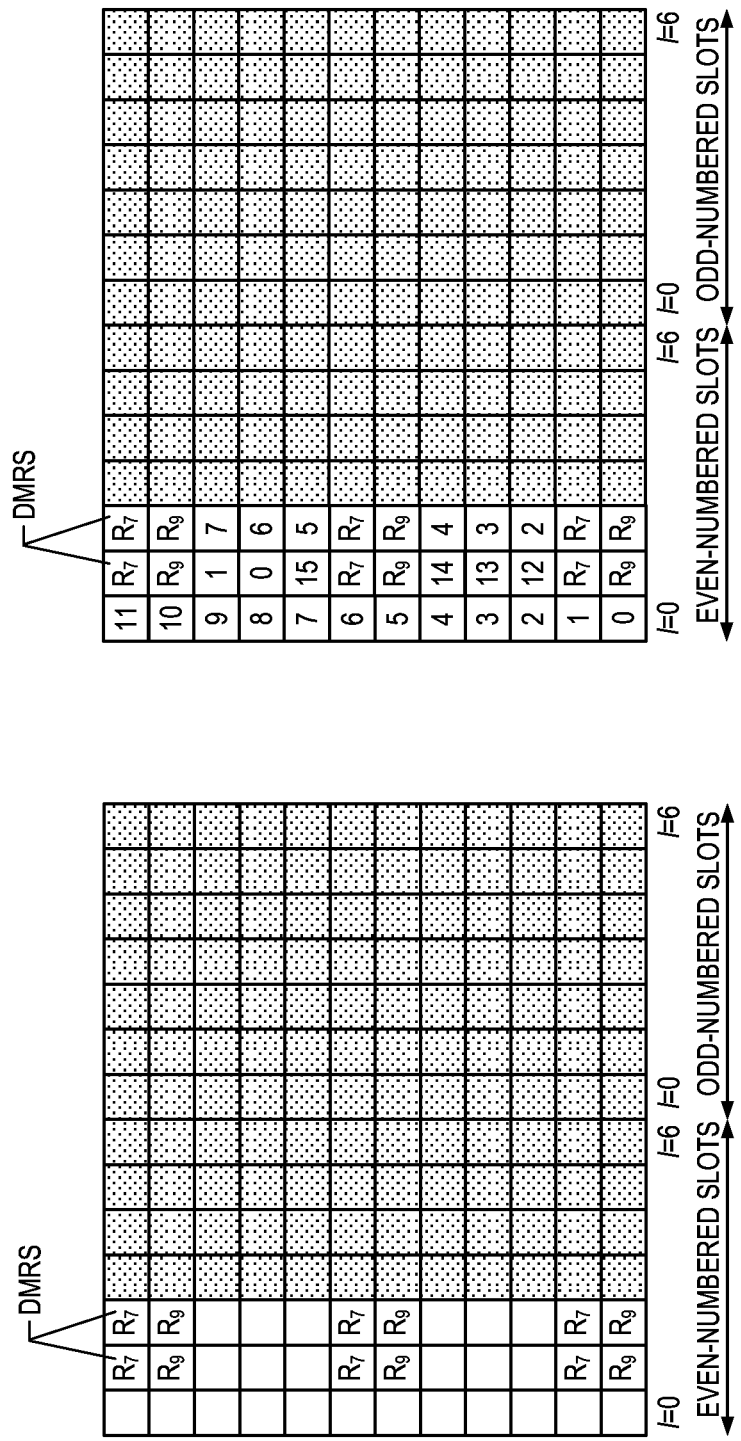

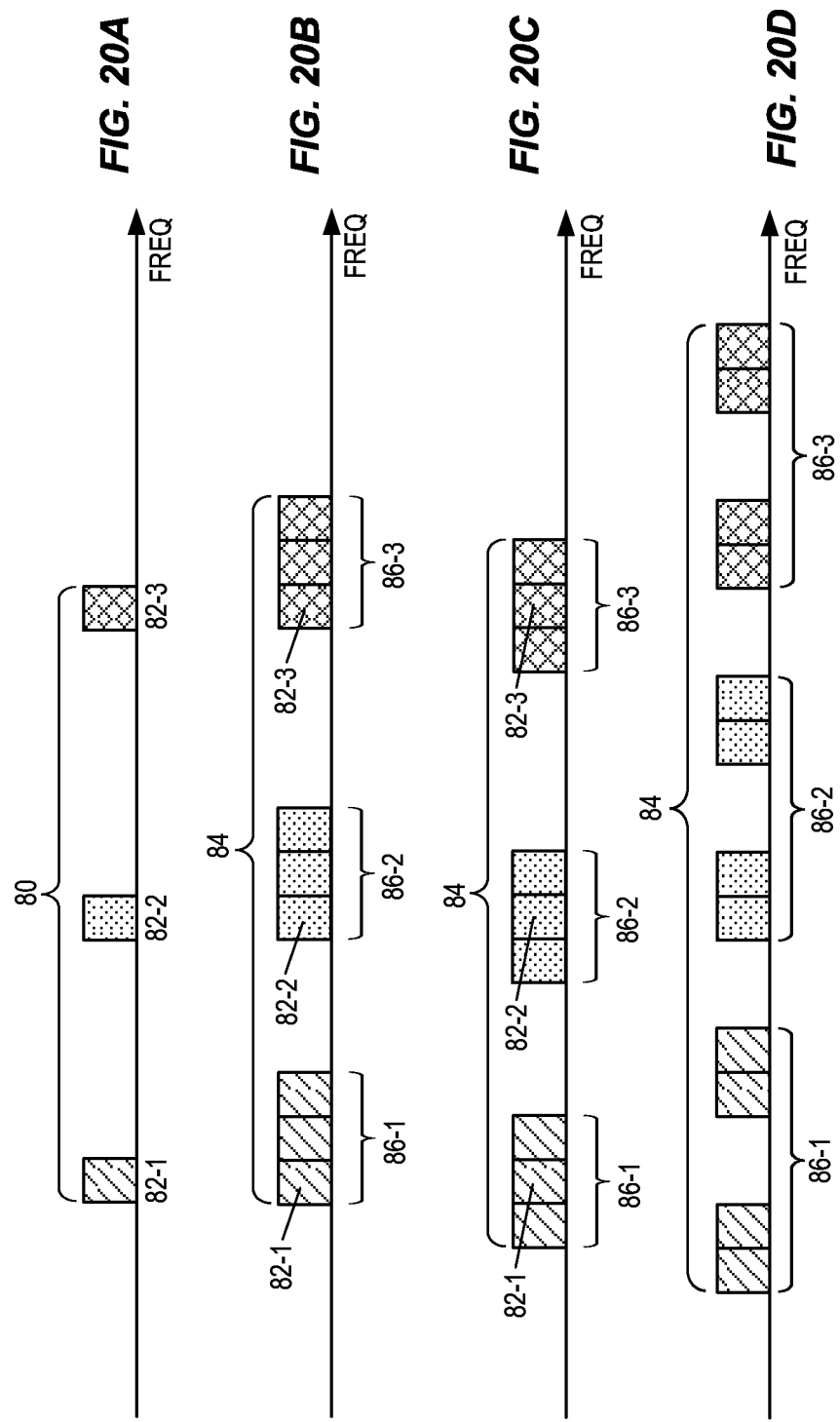

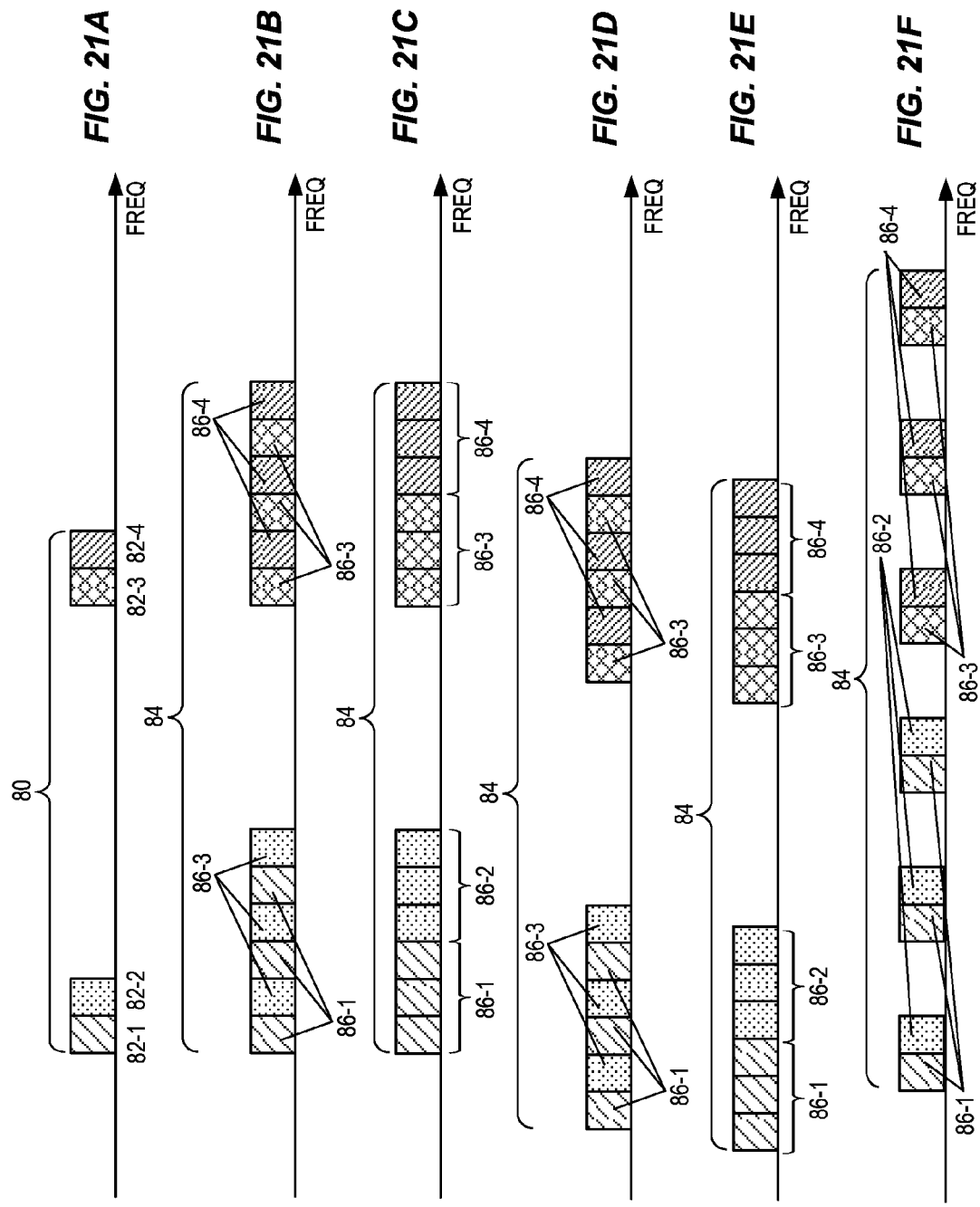

| | | |
|---|---|---|
| 3 | $R_7$ | $R_7$ |
| 2 | $R_9$ | $R_9$ |
| 1 | 9 | 15 |
| 0 | 8 | 14 |
| 15 | 7 | 13 |
| 14 | $R_7$ | $R_7$ |
| 13 | $R_9$ | $R_9$ |
| 12 | 6 | 12 |
| 11 | 5 | 11 |
| 10 | 4 | 10 |
| 9 | $R_7$ | $R_7$ |
| 8 | $R_9$ | $R_9$ |
| 11 | $R_7$ | $R_7$ |
| 10 | $R_9$ | $R_9$ |
| 9 | 1 | 7 |
| 8 | 0 | 6 |
| 7 | 15 | 5 |
| 6 | $R_7$ | $R_7$ |
| 5 | $R_9$ | $R_9$ |
| 4 | 14 | 4 |
| 3 | 13 | 3 |
| 2 | 12 | 2 |
| 1 | $R_7$ | $R_7$ |
| 0 | $R_9$ | $R_9$ |

$l=0$ ......... $l=6$  $l=0$ ......... $l=6$
EVEN-NUMBERED SLOTS   ODD-NUMBERED SLOTS

FIG. 25A

| 3 | $R_7$ | $R_7$ | | | | | | | | | | | |
|---|---|---|---|---|---|---|---|---|---|---|---|---|---|
| 2 | $R_9$ | $R_9$ | | | | | | | | | | | |
| 1 | 9 | 15 | | | | | | | | | | | |
| 0 | 8 | 14 | | | | | | | | | | | |
| 15 | 7 | 13 | | | | | | | | | | | |
| 14 | $R_7$ | $R_7$ | | | | | | | | | | | |
| 13 | $R_9$ | $R_9$ | | | | | | | | | | | |
| 12 | 6 | 12 | | | | | | | | | | | |
| 11 | 5 | 11 | | | | | | | | | | | |
| 10 | 4 | 10 | | | | | | | | | | | |
| 9 | $R_7$ | $R_7$ | | | | | | | | | | | |
| 8 | $R_9$ | $R_9$ | | | | | | | | | | | |
| 11 | $R_7$ | $R_7$ | | | | | | | | | | | |
| 10 | $R_9$ | $R_9$ | | | | | | | | | | | |
| 9 | 1 | 7 | | | | | | | | | | | |
| 8 | 0 | 6 | | | | | | | | | | | |
| 7 | 15 | 5 | | | | | | | | | | | |
| 6 | $R_7$ | $R_7$ | | | | | | | | | | | |
| 5 | $R_9$ | $R_9$ | | | | | | | | | | | |
| 4 | 14 | 4 | | | | | | | | | | | |
| 3 | 13 | 3 | | | | | | | | | | | |
| 2 | 12 | 2 | | | | | | | | | | | |
| 1 | $R_7$ | $R_7$ | | | | | | | | | | | |
| 0 | $R_9$ | $R_9$ | | | | | | | | | | | |

$l=0$ ......... $l=6$ $l=0$ ......... $l=6$
← EVEN-NUMBERED SLOTS → ← ODD-NUMBERED SLOTS →

FIG. 25B

| 15 | R₇ | R₇ | | | | | | | | | | | |
|----|----|----|--|--|--|--|--|--|--|--|--|--|--|
| 14 | R₉ | R₉ | | | | | | | | | | | |
| 13 | 7 | 15 | | | | | | | | | | | |
| 12 | 6 | 14 | | | | | | | | | | | |
| 11 | 5 | 13 | | | | | | | | | | | |
| 10 | R₇ | R₇ | | | | | | | | | | | |
| 9 | R₉ | R₉ | | | | | | | | | | | |
| 8 | 4 | 12 | | | | | | | | | | | |
| 7 | 3 | 11 | | | | | | | | | | | |
| 6 | 2 | 10 | | | | | | | | | | | |
| 5 | R₇ | R₇ | | | | | | | | | | | |
| 4 | R₉ | R₉ | | | | | | | | | | | |
| 3 | R₇ | R₇ | | | | | | | | | | | |
| 2 | R₉ | R₉ | | | | | | | | | | | |
| 1 | 1 | 9 | | | | | | | | | | | |
| 0 | 0 | 8 | | | | | | | | | | | |
| 15 | 15 | 7 | | | | | | | | | | | |
| 14 | R₇ | R₇ | | | | | | | | | | | |
| 13 | R₉ | R₉ | | | | | | | | | | | |
| 12 | 14 | 6 | | | | | | | | | | | |
| 11 | 13 | 5 | | | | | | | | | | | |
| 10 | 12 | 4 | | | | | | | | | | | |
| 9 | R₇ | R₇ | | | | | | | | | | | |
| 8 | R₉ | R₉ | | | | | | | | | | | | l=0   l=6   l=0   l=6
EVEN-NUMBERED SLOTS   ODD-NUMBERED SLOTS

*FIG. 26A*

METHOD AND APPARATUS FOR CONTROL CHANNEL RESOURCE ALLOCATIONS IN CONSTRAINED AND UNCONSTRAINED SUBFRAMES IN A WIRELESS COMMUNICATION NETWORK

TECHNICAL FIELD

The present invention generally relates to wireless communication networks, and particularly relates to the allocation of control channel resources within constrained subframes.

BACKGROUND

Long Term Evolution or LTE uses Orthogonal Frequency Division Multiplexing or OFDM in the downlink and DFT-spread OFDM in the uplink, where DFT denotes "Discrete Fourier Transform". The basic LTE physical resources can thus be seen as a time-frequency grid as illustrated in FIG. 1, where each resource element corresponds to one subcarrier during one OFDM symbol interval on a particular antenna port. An antenna port is defined such that the channel over which a symbol on the antenna port is conveyed can be inferred from the channel over which another symbol on the same antenna port is conveyed. There is one resource grid per antenna port, and resource elements may be referred to as "Resource Elements" or REs.

In the time domain, LTE downlink transmissions are organized into radio frames of 10 milliseconds. Each radio frame includes ten equally sized subframes of 1 millisecond. FIG. 2 illustrates this arrangement and one sees from the diagram that each subframe is divided into two slots, with each slot having a duration of 0.5 milliseconds.

Resource allocation in LTE is described in terms of Physical Resource Blocks or PRBs. As shown in FIG. 3, a PRB corresponds to one slot in the time domain and 12 contiguous 15 kHz subcarriers in the frequency domain. The bandwidth, $N_{BW}$, of the overall system determines the number of PRBs in each slot and each PRB spans 7 or 6 OFDM symbols, depending upon the length of the Cyclic Prefix, CP, used. Two consecutive PRBs in time represent a PRB pair, and correspond to the time interval upon which user scheduling operates.

In that regard, transmissions in LTE are dynamically scheduled based on transmitting downlink assignments and uplink grants to targeted UEs. According to 3GPP Release 8, such control information is transmitted in a defined control region using Physical Downlink Control Channels or PDCCHs targeted to specific UEs. See "Universal Mobile Telecommunications System (UMTS); Technical Specifications and Technical Reports for a UTRAN-based 3GPP system", 3GPP TS 21.101 version 8.4.0 Release 8. The search space for PDCCH reception is known to the UEs, which blindly decode those portions of the received signal to find PDCCHs targeted to them. More broadly, PDCCHs are used to convey UE-specific scheduling assignments for the downlink and uplink grants, as noted, and is further used for Physical Random Access Channel or PRACH responses, uplink power control commands, and common scheduling assignments for signaling messages that among other things include system information, paging.

FIG. 4 illustrates that a "normal" downlink subframe includes a control region at the beginning of the subframe, followed by a data region. The size of the control region in which PDCCHs are transmitted can vary in size from one to four OFDM symbols in dependence on the involved configuration. A Physical Control Format Indicator or PCFICH is used to indicate the control region length and is transmitted within the control region at locations known by the UEs. A UE thus learns the size of the control region in a given downlink subframe by decoding the PCFICH transmitted in that subframe, and therefore knows in which OFDM symbol the data transmission starts.

To better understand the construction of PDCCHs, consider that the term "CCE" denotes Control Channel Elements and that each CCE consists of nine REGs, where the term "REG" denotes a Resource Element Group. Each REG consists of four REs. LTE defines four PDCCH formats 0-3, which use aggregation levels of 1, 2, 4, and 8 CCEs, respectively. Given the modulation format used for PDCCH transmission, two bits can be transmitted on a single RE aggregated within a PDCCH, therefore, with 1 CCE=9 REGs=4 REs/REG×9 REGs=36 REs×2 bits/symbol, one can transmit 72 bits via a format 0 PDCCH, 144 bits via a format 1 PDCCH, etc. As noted, PDCCHs are transmitted in the defined control region—the first 1-4 symbols—of any given downlink subframe and extend over substantially the entire system. Thus, the size of the control region in the given downlink subframe and the overall system bandwidth define the number of overall CCEs available for PDCCH transmission.

FIG. 4 also illustrates the presence of Cell-specific Reference Symbols or CRS within the downlink subframe. The CRS location and modulation sequence are known by the UEs and used for estimation of the radio channel and in turn the channel estimates are used in the demodulation of data by the UEs. CRS are transmitted in all downlink subframes and in addition to assisting downlink channel estimation they are also used for mobility measurements performed by the UEs. Because the CRS are common to all UEs in a cell, the transmission of CRS cannot be easily adapted to suit the needs of a particular UE. Therefore, LTE also supports UE-specific RS aimed only for assisting channel estimation for demodulation purposes. These UE-specific RS are referred to as Demodulation Reference Symbols or DMRS. DMRS for a particular UE are placed in the data region of the downlink subframe, as part of Physical Downlink Shared Channel, PDSCH, transmissions.

Release 11 by the 3GPP introduced enhanced PDCCHs, or EPDCCHs. An EPDCCH uses REs in the data region associated with PDSCH transmissions, rather than REs within the defined control region at the beginning of the subframe. See "Universal Mobile Telecommunications System (UMTS); Technical Specifications and Technical Reports for a UTRAN-based 3GPP system", 3GPP TS 21.101 version 11.0.0 Release 11.

FIG. 5 provides a basic illustration of PRB pairs allocated from the data region of a downlink subframe, for use in the transmission of given EPDCCHs. The remaining PRB pairs in the data portion of the subframe can be used for PDSCH transmissions; hence the EPDCCH transmissions are frequency multiplexed with PDSCH transmissions. That arrangement is contrary to PDCCH transmissions, which are time multiplexed with respect to PDSCH transmissions—i.e., PDCCH transmission occur only in the control portion of the downlink subframe, which occurs in time before the data portion in which PDSCH transmissions are performed. Notably, Release 11 does not support multiplexing of PDSCH and any EPDCCH transmission within the same PRB pair.

According to current convention, a UE can be configured with one or two EPDCCH sets of PRB pairs. Each set consists of N=2, 4, or 8 PRB pairs. Furthermore, two modes of EPDCCH transmission are supported, the localized and the distributed EPDCCH transmission, and each set is independently configured as being of localized or distributed type. In distributed transmission, an EPDCCH is mapped to resource elements in an EPDCCH set in a distributed manner (across all PRB pairs in the set). In this way frequency diversity can be achieved for the EPDCCH message. See FIG. 6 for an example distributed transmission, where N=4 is illustrated.

In a localized transmission, an EPDCCH is mapped to one PRB pair only, if the space allows, which is always possible for aggregation levels one and two, and also for aggregation level four, for the case of a normal, "unconstrained" subframe and a normal CP length. In case the aggregation level of the EPDCCH is too large so that it does not fit into one PRB pair, a second PRB pair is used as well, and so on, using more PRB pairs, until all ECCE belonging to the EPDCCH have been mapped. See FIG. 7 for an illustration of localized transmission. Here, an "unconstrained" or normal subframe is one having a PDSCH or data region that is not abbreviated, such as in the case of "special" subframes in TDD LTE that include uplink and downlink portions, or is not given over to another purpose, such as Multicast-Broadcast Single Frequency Network, MBSFN, transmissions.

In the EPDCCH context, CCEs are referred to as ECCEs and REGs are referred to as EREGs. To facilitate the mapping of ECCEs, to physical resources, each PRB pair allocated for EPDCCH use is divided into 16 EREGs and each ECCE is split into L=4 or L=8 EREGs for normal and extended CP, respectively. An EPDCCH is consequently mapped to a multiple of four or eight EREGs. The particular multiple used depends on the aggregation level of the EPDCCH. Further, the EREGs belonging to an EPDCCH reside in either a single PRB pair, which is typical for localized transmission, or a multiple of PRB pairs, which is typical for distributed transmission.

The division of a PRB pair with normal CP into EREGs is illustrated in FIG. 8 for an unconstrained subframe. Each block or tile is an RE and the tile number corresponds to the EREG the RE is grouped within. For example, tiles having the dotted background all belong to same EREG indexed at 0. Furthermore, the L=4 or L=8 EREGs respectively are grouped into the ECCEs as specified in 3GPP Technical Specification 36.213. For example, ECCE#0 is for L=4 using EREG#{0,4,8,12} and ECCE#1 is using EREG#{4, 8,12,0} etc. Furthermore, ECCE#4 is using EREG#{1,5,9, 13} and so on. For normal, unconstrained subframes, an EPDCCH set of N PRB pairs has a total of 4N ECCEs for L=4 and 2N ECCEs for L=8. Note that this grouping of REs into EREGs is the same for both localized and distributed EPDCCH sets. In localized sets, the EREG belonging to an ECCE (e.g. EREG#0,4,8,12) is taken from the same PRB pair, while in distributed EPDCCH transmission and for, e.g., N=4, the four EREGs belonging to an ECCE is taken from the four different PRB pairs respectively.

When mapping an EPDCCH to REs, if the EPDCCH collides with the use of REs by other signals, such as own-cell CRS or the own-cell legacy control region, the other signals have priority. Therefore, the EPDCCH is mapped around any such "occupied" REs and code chain rate matching is applied. This approach means that the effective number of available REs per EREG for EPDCCH use is usually less than the 9 REs. However, the colliding signals do not introduce interference into EPDCCH decoding at the UEs because EPDCCH is mapped around them. The UE normally monitors a set of ECCE aggregation levels {1, 2, 4, 8} but if the number of available REs per PRB pair is less than a threshold, X_thresh=104, then the UE instead monitors a shifted set of aggregation levels {2, 4, 8, 16}, because the smallest aggregation level, AL=1, has too few available REs to be practically useful.

The reception of EPDCCH at the UEs relies on DMRS for demodulation, where antenna ports 107-110 have been defined for this purpose. These antenna ports are the same as ports 7-10 used for PDSCH demodulation, apart from an independent DMRS scrambling sequence initialization. In a localized transmission case, and with normal CP, all four antenna ports are available and the EPDCCH use one of these in the PRB pair. In distributed transmission, two of the four antenna ports are used for EPDCCH demodulation in the PRB pair, so as to achieve spatial diversity for the EPDCCH transmission. In normal CP, ports 107 and 109 are used, corresponding to ports 7 and 9 for PDSCH. With extended CP, ports 107 and 108 are used for EPDCCH.

As noted, according to current convention, a UE can be configured with one or two EPDCCH sets of PRB pairs. In accordance with the convention defined in the applicable standards, each set consists of N={2,4,8} PRB pairs. A normal or unconstrained subframe has a nominal number of REs available for EPDCCH use in each PRB pair within the base set. However, with this conventional definition of PRB pair sets, EPDCCH capacity and coverage becomes problematic in "constrained" subframes, which, in comparison to a normal or unconstrained subframe, have fewer numbers of REs available for EPDCCH use within the underlying PRB pairs used to form the base sets of N=2, 4, or 8 PRB pairs allocated for EPDCCH use.

That is, for constrained subframes, the PRB pairs for EPDCCH use have a fewer number of REs available within them, as compared to the number available in a normal, unconstrained subframe. Consider an example where in a constrained subframe 16 EREGs are available for EPDCCH allocation, but each EREG includes only one or two allocable REs per PRB pair. One ECCE therefore will contain between N and 2N REs, when N represents the number of PRB pairs in the base set of PRB pairs allocated for EPDCCH use in the subframe. For N=8, the maximum number of REs per ECCE would equal 16. Hence, a large number of ECCEs would need to be aggregated to provide the same EPDCCH coverage or capacity as offered in normal subframes. A similar problem holds for essentially any type of shortened or special subframe, all of which are broadly referred to herein as constrained subframes.

FIG. 9 provides an example of the above circumstances in the context of a special subframe as used in TDD LTE. One sees a sequence or series of TDD subframes, including normal downlink, "D", and uplink, "U", subframes that are entirely allocated to downlink and uplink use, respectively. The illustrated special subframe is interposed between the normal downlink and uplink subframes. The special subframe includes a downlink portion and an uplink portion, with the two portions separated by a guard time. Because the special subframe accommodates downlink and uplink portions, the downlink portion of a special subframe is abbreviated as compared to a normal downlink subframe and the available number of REs within an ECCE is therefore abbreviated as compared to a normal downlink subframe.

The specific structure of special subframes in TDD LTE depends on the special subframe configuration in use, of which LTE defines nine configurations. However, in general, transmissions that rely on DMRS cannot be present in all special subframes because the guard band and uplink portion of special subframes overlap the DMRS transmission patterns. Hence, UEs are not expected to receive PDSCH in a special subframe with special subframe configuration 0 or 5 in normal CP, or special subframe configuration 0, 4, or 7 in extended CP. Furthermore, the UE is not expected to receive PDSCH in a special subframe with special subframe configuration 0 or 5 in normal CP, or special subframe configuration 0, 4 in extended CP. In such instances, EPDCCH is not used for scheduling and PDCCH is used instead.

As recognized herein, however, reliance on PDCCH in such instances is problematic. For example, from Release 11 forward, new carrier types are being considered. One type of carrier, noted here as Type A, retains backwards compatibility with Release 8 UEs. Consequently, this carrier type also may be referred to as a Legacy Carrier Type or LCT. The second type of carrier may be identified as a Type B or New Carrier Type, NCT. The NCT is described as a carrier type that contains either no CRS at all or many fewer CRS in frequency and/or in time. Further, the NCT does not contain any PDCCH but does contain EPDCCH. As noted, an EPDCCH does not rely on CRS for demodulation. While the NCT is attractive for its energy efficiency properties, its low control and reference signal overhead and low level of interference generation in networks, as compared to the LCT, it does not allow for the use of PDCCH as a fallback mechanism for transmitting user scheduling information in constrained subframes where DMRS/EPDCCH cannot be transmitted according to current conventions. Because there may be a large number of problematic, constrained subframes present in the context of NCT usage, there may be significant throughput reduction arising from the inability to send scheduling information in constrained subframes.

Multicast/Broadcast Single Frequency Network, MBSFN, subframes represent another noted example of constrained subframes. FIG. 10 illustrates an MBSFN subframe. As indicated by the name, the original intention for MBSFN subframes was to support multicast such as Multimedia broadcast services. An MBSFN subframe consists of a control region of length one or two OFDM symbols, which is in essence identical to the control-region counterpart in a normal subframe. However, in an MBSFN subframe, the control region is followed by an MBSFN region. Retention of the control region in MBSFN subframes provides for the transmission of control signaling using PDCCH, which is necessary for scheduling uplink transmissions. All terminals, from LTE release 8 and onwards, are capable of receiving the control region of an MBSFN subframe. Terminals not capable of receiving transmissions in the MBSFN region will simply ignore those transmissions.

Information about the set of subframes that are configured as MBSFN subframes in a cell is provided as part of the transmitted system information. In principle, an arbitrary pattern of MBSFN subframes can be configured with the pattern repeating after 40 milliseconds. However, as information necessary to operate the system needs to be transmitted in order for UEs to find and connect to a cell, subframes where such information is provided cannot be configured as MBSFN subframes. Therefore, subframes 0, 4, 5, and 9 for Frequency Division Duplex, FDD, and subframes 0, 1, 5, and 6 for TDD cannot be configured as MBSFN subframes. That leaves the remaining six subframes as candidates for possible configuration as MBSFN subframes.

One possible solution to addressing EPDCCH resource shortages in constrained subframes, such as MBSFN subframes or special subframes used in TDD LTE, depends on simply increasing the value of N for constrained subframes as compared to unconstrained subframes. That is, one may increase the number of PRB pairs included in the base sets of PRB pairs allocated for EPDCCH usage. However, it is recognized herein that considerable complexity surrounds any solution to make more REs available for EPDCCH usage in a constrained subframe. For example, increasing the value of N for constrained subframes would require new definitions of how an ECCE is defined in terms of groupings of EREGs. If the number of PRB pairs included in the base set of PRB pairs is increased to N=32, for example, then an ECCE would consist of a list of 32 EREGs, which is inflexible. Further, supporting new values of N for EPDCCH sets would require specification changes in terms of search space definitions and blind decoding candidate distributions, for proper UE operation.

SUMMARY

Among other advantageous aspects, the teachings herein provide network-side and device-side apparatuses and methods that preserve normal Resource Element (RE) aggregation levels for the transmission of Enhanced Physical Downlink Control Channels (EPDCCHs) in "constrained" subframes, where "constrained" refers to any subframe having fewer REs available for EPDCCH usage within a base set of PRB pairs than are available in a "non-constrained" or "normal" subframe. Non-limiting examples of "constrained" subframes include special subframes in Time Division Duplex, TDD, operation, which comprise a downlink portion that is abbreviated to accommodate an included uplink portion, along with a guard portion between them. Multimedia Broadcast Single Frequency Network, MBSFN, subframes represent another example of a constrained subframe, where only the first two OFDM symbols within the subframe are available for EPDCCH transmissions.

According to the teachings herein, some "nominal" number of PRB pairs are included in a defined set of PRBs, the "base" set, to be used for EPDCCH transmissions in a given unconstrained subframe and, advantageously, for EPDCCH transmissions in a constrained subframe, the base set of PRB pairs is inflated or expanded. The expansion accounts for the fact that, as a consequence of the subframe being constrained, each PRB pair in the base set offers fewer REs available for EPDCCH aggregation, as compared to RE availability within a normal, unconstrained subframe.

The expansion of the set of PRB pairs may be performed in accordance with a predefined expansion rule that defines where the expanded PRB pairs are located. The expansion rule would be known on the network side and the device side, so that a given eNodeB or other network-side transmitter would expand the configured base set of PRB pairs in a given constrained subframe using additional PRB pairs at locations defined by the known rule. Correspondingly, on the device side, a UE or other wireless device—also referred to as a wireless apparatus—would automatically expand or otherwise adjust its EPDCCH "search spaces" in view of the known rule for PRB pair expansion. Other arrangements for determining and/or adjusting the expansion of PRB pairs for EPDCCH are contemplated herein, including static, semi-static and dynamic approaches. In at least some embodiments, the expansion and related processing modifications on the network side and on the device side occur automatically for constrained subframes. In an example, "processing modifications" denotes changes in how EPDCCHs are aggregated on the network side and how they are received on the device side, as compared to operations in unconstrained subframes.

Thus, in one example, in a given subframe where there is an EPDCCH resource problem—i.e. in a constrained subframe—DMRS antenna ports are inserted in one or more of the OFDM symbols available in the constrained subframe for such transmission, and a configured EPDCCH set of PRB pairs—i.e., a base set—that nominally includes N PRB pairs is inflated or expanded to include QN PRB pairs. In particular, the expanded set of PRB pairs includes N groups of Q PRB pairs in each group, for a total of QN PRB pairs in the expanded set. The Q PRB pairs included in each one of the Q groups in the expanded set includes one of the original PRB pairs in the base set, along with Q−1 additional PRB pairs.

It is contemplated herein that the selection process for adding the additional PRB pairs to the expanded set may be configured to enhanced frequency diversity for the EREGs used to form the EPDCCHs and/or to make the number of REs available for EPDCCH use in each group more uniform. In any case, the expansion may be done so as to make the overall number of REs available in the expanded set the same as are available from the base set in an unconstrained subframe. Such an approach simplifies user scheduling across any mix of constrained and unconstrained subframes.

Further, it is contemplated in some embodiments that the Q−1 additional PRB pairs in each group of PRB pairs in the expanded set be "repeats" of the original PRB pair included in that group from the base set of PRB pairs. Here, the original PRB pair in the group may be referred to as the "base" PRB pair within that group, and the Q−1 additional PRB pairs in the group may be referred to as "repeated" PRB pairs. Each repeated PRB pair is repeated with respect to the corresponding base PRB pair in the sense that it uses the same REs as used by a candidate EPDCCH for the base PRB pair. Advantageously, by repeating each base PRB to form the respective N groups of Q PRBs, the wireless device can be configured to use the same search space for each repeated PRB pair as used for the corresponding base PRB pair.

Broadly, one may view expansion process as augmenting or supplementing a base or nominal ePDDCH set of PRB pairs to account for the reduction in REs available for EPDCCH use in each base PRB pair within a constrained subframe. In this sense, for each PRB pair in the base set, the approach taught herein adds an additional Q−1 PRB pairs. Q may therefore be viewed as an expansion factor, where the expansion process increases the number of REs available for EPDCCH aggregation in the constrained subframe by a factor of Q, as compared to what would be available from only the base set of PRB pairs in the constrained subframe. That is, for each RE available in any one of the PRB pairs in the base set, expansion processing adds an additional Q−1 REs.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 18 and 19 is a diagram illustrating an embodiment of DMRS insertion into a given PRB pair in a base set of PRB pairs within a constrained subframe, and corresponding example RE/EREG mappings.

FIG. 20A is a diagram illustrating an example base set of PRB pairs for EPDCCH use, and FIGS. 20B-20D illustrate various configurations contemplated for an expanded set of PRB pairs as derived from the base set.

FIG. 21A is a diagram illustrating an example base set of PRB pairs for EPDCCH use, and FIGS. 21B-21F illustrate further example configurations contemplated for an expanded set of PRB pairs as derived from the base set.

FIGS. 25A and 25B are together a diagram illustrating an example of RE to EREG mapping in one embodiment of EPDCCH set expansion taught herein.

FIGS. 26A and 26B are together a diagram illustrating an example of RE to EREG mapping in another embodiment of EPDCCH set expansion taught herein.

DETAILED DESCRIPTION

Figure 1:
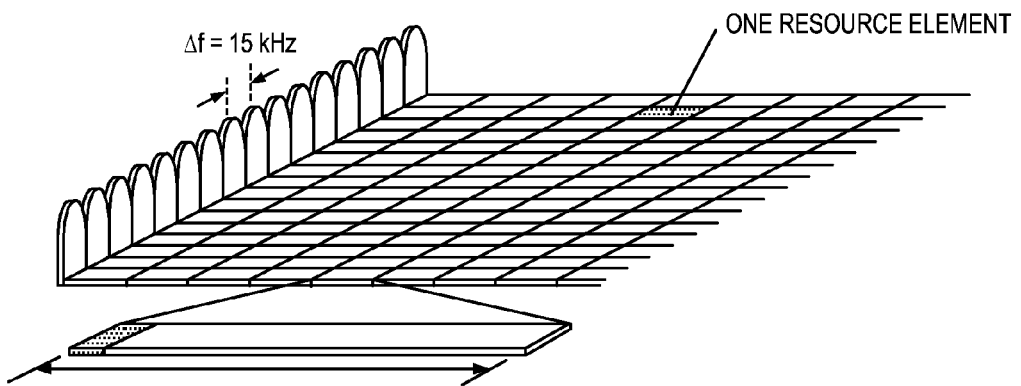
FIG. 1 is a diagram illustrating physical resources as defined in LTE.
Figure 2:
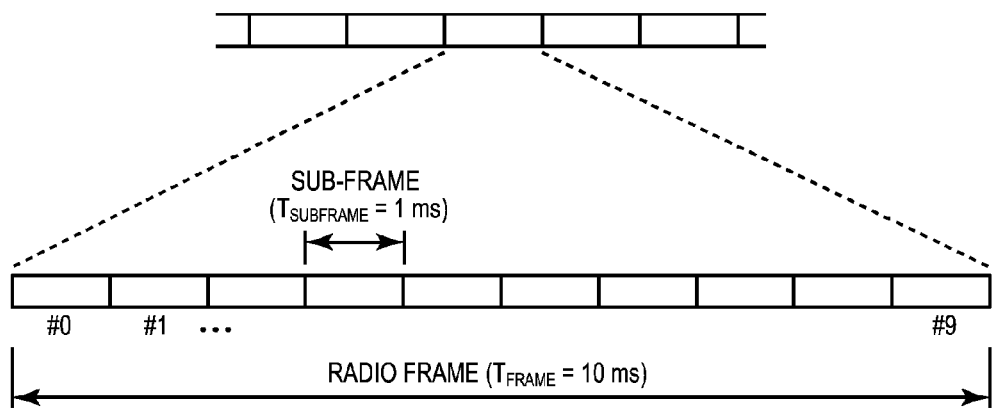
FIG. 2 is a diagram of the LTE time-domain structure.
Figure 3:
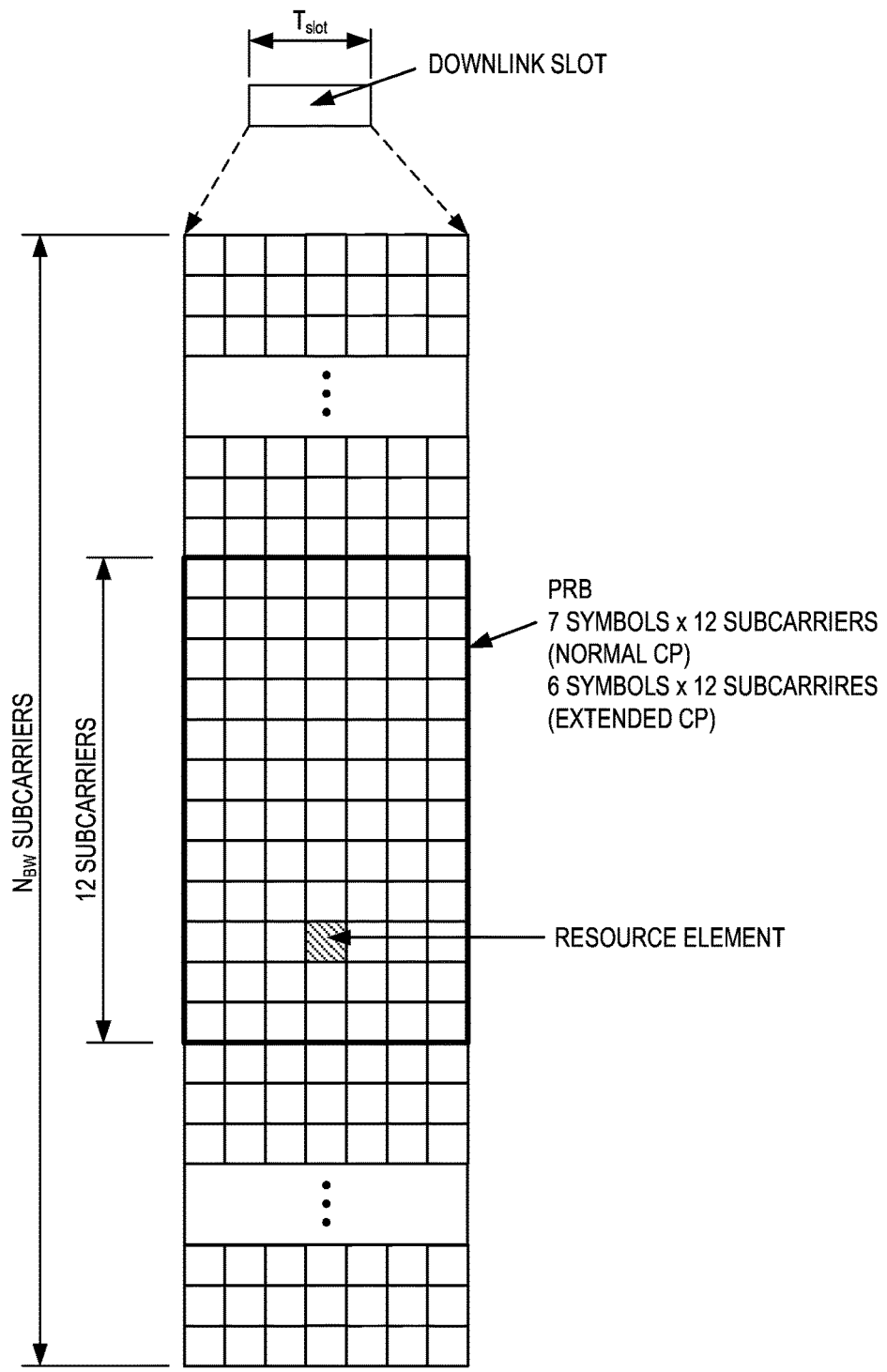
FIG. 3 is a diagram of a PRB pair within an LTE time-frequency grid.
Figure 4:
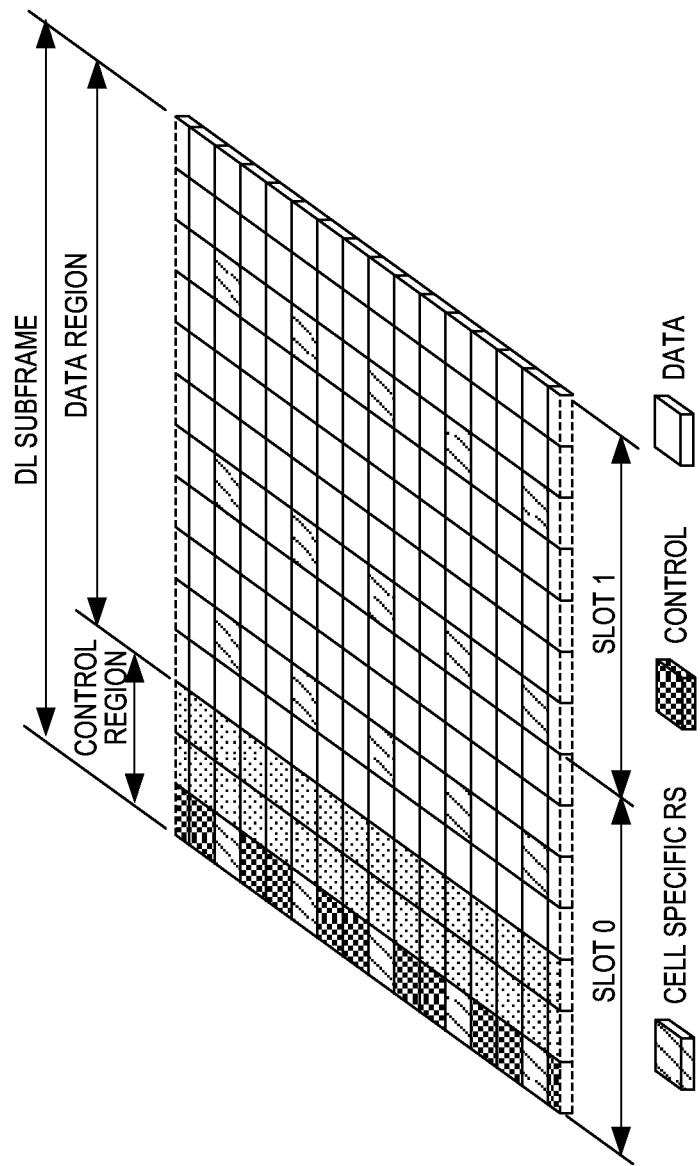
FIG. 4 is a diagram of mapping within an LTE downlink subframe for PDCCH, CRS, etc.
Figure 5:
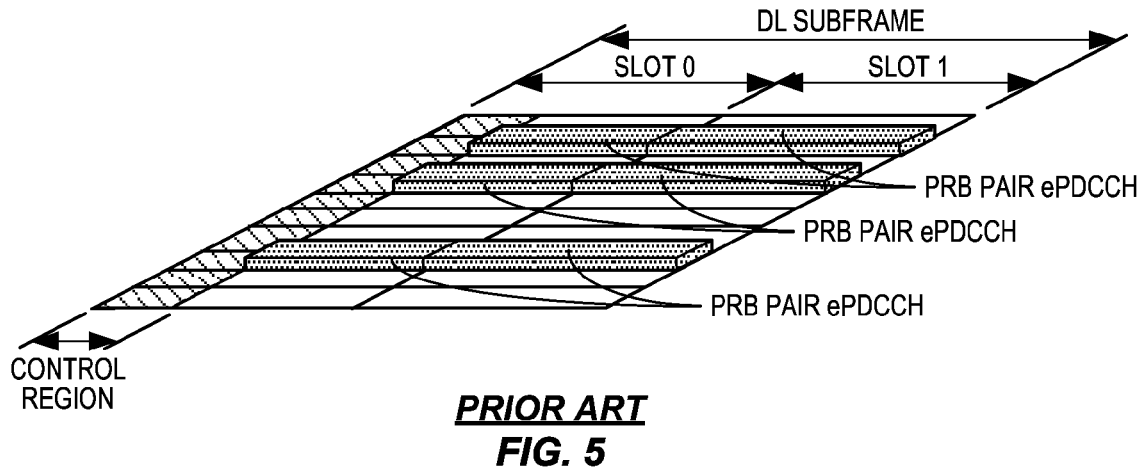
FIG. 5 is a diagram of EPDCCH, as defined in the PDSCH region of a downlink subframe.
Figure 6:
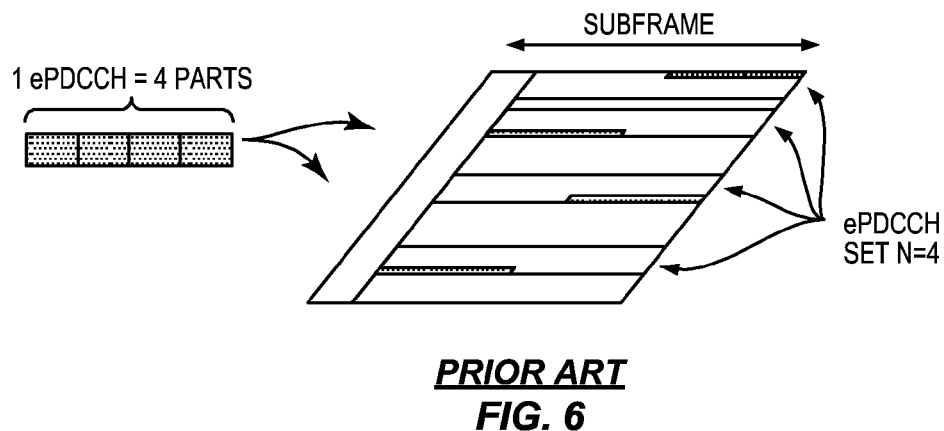
FIGS. 6 and 7 are examples of distributed and localized sets of PRBs, respectively, as used for EPDCCH.
Figure 7:
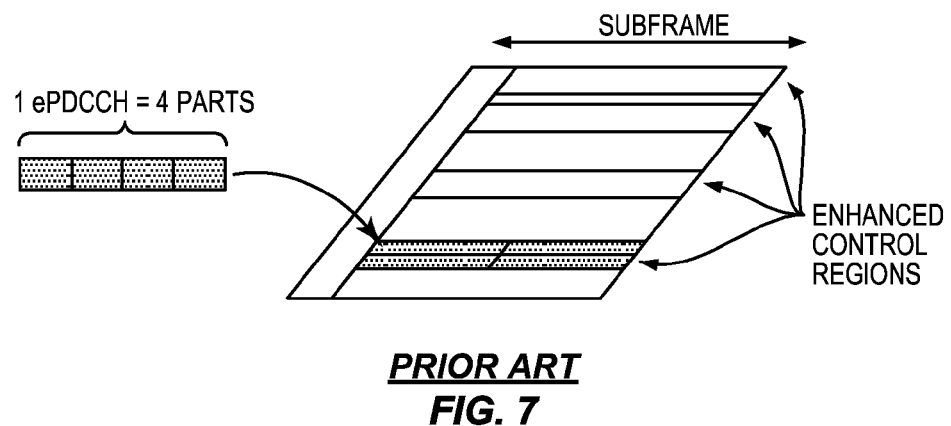
Figure 8:
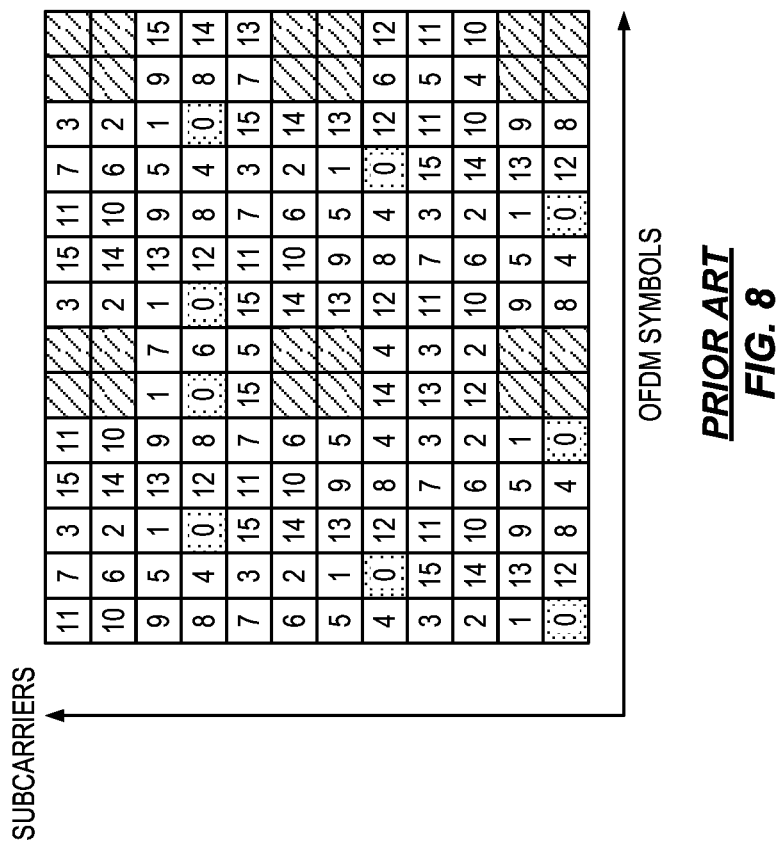
FIG. 8 is a diagram of RE/EREG mapping within a PRB pair using normal CP.
Figure 9:
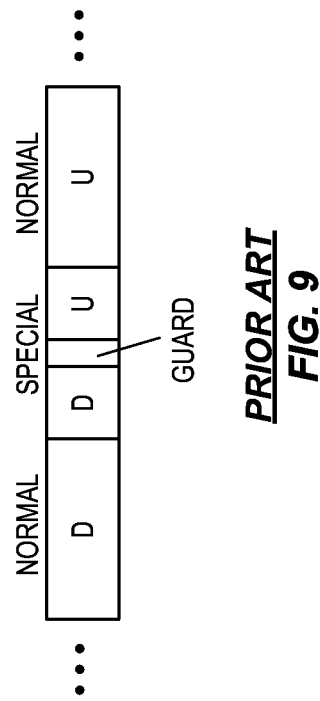
FIG. 9 is a diagram of example TDD subframes in LTE, including a special subframe interposed between normal downlink and uplink subframes.
Figure 10:
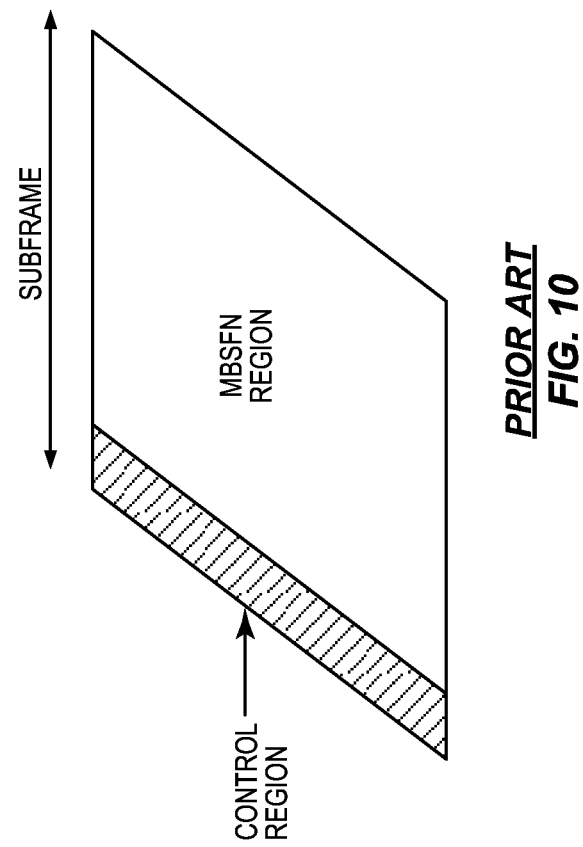
FIG. 10 is a diagram of an example MBSFN subframe.
Figure 11:
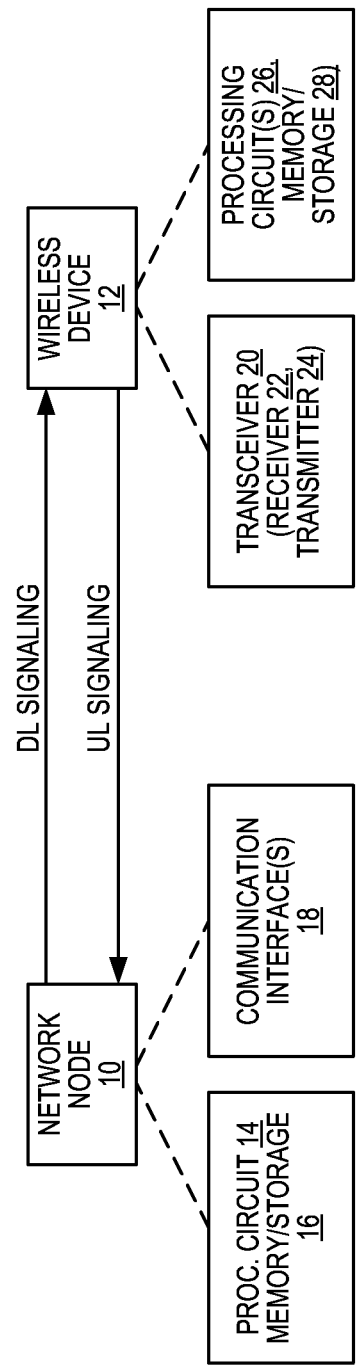
FIG. 11 is a block diagram of an example embodiment of a network node and a wireless device that are configured according to the teachings herein.

FIG. 11 illustrates a network node 10 and a wireless device 12. According to the teachings herein, the network node 10 is configured to carry out network-side processing for the "set expansion" teachings herein. In particular, the network node 10 is configured to "expand" a base set of N PRB pairs for EPDCCH use in a constrained subframe in a manner that preserves compatibility with the base set definitions used in unconstrained, normal subframes, while simultaneously providing a greater number of REs available for EPDCCH aggregation than would be available in the constrained subframe if a conventional base set was used without expansion. Correspondingly, the wireless device 12 is configured to carry out complementary device-side processing in constrained subframes that provides for reception of EPDCCH transmitted using an expanded set of PRB pairs.

The network node 10 includes one or more processing circuits 14 and associated memory/storage 16. The memory/storage 16 may be one or more types of computer-readable medium, such as a mix of volatile, working memory and non-volatile configuration and program memory or storage. The network node 10 further includes one or more communication interfaces 18. The communication interface(s) 18 depend on the nature of the network node 10. In a base station or other radio node example, the communication interface(s) 18 include a radio transceiver—e.g., pools of radio transmission, reception, and processing circuitry—for communicating with any number of wireless devices 12 in any one or more cells of a wireless communication network. Further, the network node 10 may support Carrier Aggregation, CA, operation, Time Division Duplex, TDD, operation, Multiple-Input-Multiple-Output, MIMO, operation, etc. Additionally, the communication interface(s) 18 may include inter-base-station interfaces and/or backhaul or other CN communication interfaces. In an LTE-based example where the network node 10 comprises an eNodeB, the communication interface(s) 18 include an "X2" interface for inter-eNodeB communications.

Correspondingly, the wireless device 12 may be a cellular radiotelephone—smartphone, feature phone, tablet, etc.—or may be a network adaptor, card, modem or other such interface device, or may be a laptop computer or other such device with integrated wireless communication capabilities. Of course, these examples are non-limiting and the wireless device 12 should be broadly understood as a communications transceiver configured for network operation according to the teachings herein.

The wireless device 12 includes a transceiver 20, which includes a receiver 22 and a transmitter 24, which are cellular radio circuits, for example. The illustrated wireless device 12 further includes one or more processing circuits 26, which include or are associated with one or more memory/storage devices or circuits 28. The memory/storage 28 includes, for example, one or more types of computer-readable medium. Example media include a mix of volatile, working memory and non-volatile configuration and program memory or other storage—e.g., EEPROM and/or FLASH memory.

Those of ordinary skill in the art will appreciate that the transmitter 20 and/or receiver 22 each may comprise a mix of analog and digital circuits. For example, the receiver 22 in one or more embodiments comprises a receiver front-end circuit, which is not explicitly shown in FIG. 11. Such circuitry generates one or more streams of digital signal samples corresponding to antenna-received signal(s) and receiver processing circuits—e.g., baseband digital processing circuitry and associated buffer memory—operate on the digital samples. Example operations include linearization or other channel compensation, possibly with interference suppression, and symbol demodulation and decoding, for recovering transmitted information.

Those of ordinary skill in the art will appreciate that FIG. 11 illustrates functional and/or physical circuit arrangements and that the network node 10 and the wireless device 12 generally will include digital processing circuits and associated memory or other computer-readable medium, for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions. The functional circuits realized in this manner shall be understood as "machines" specially adapted for the purpose(s) described herein. The processing circuit 14 in the network node 10 and the processing circuit 26 in the wireless device 12 may be at least partly configured in this manner.

Figure 12:
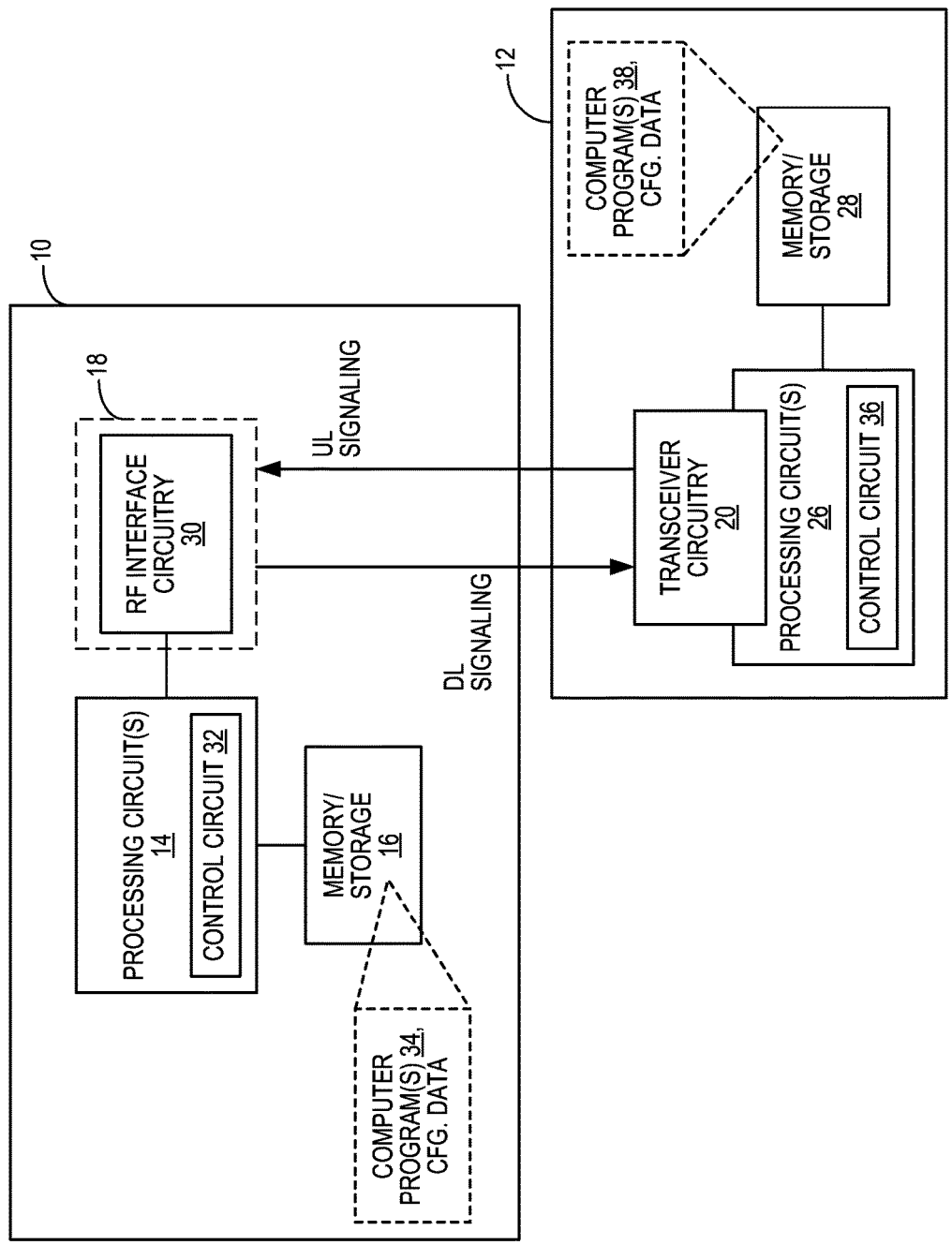
FIG. 12 is a block diagram of example details for the network node and wireless device of FIG. 11.

FIG. 12 provides example details for the network node 10 and the wireless device 12 in an embodiment where the network node 10 is an eNodeB configured for operation in an LTE network, or is another type of base station or radio node. Consequently, the network node 10 in such embodiments includes RF interface circuitry 30, which represents or is included in the communication interface(s) 18 introduced in FIG. 11. Further, the processing circuit 14, which may comprise one or more microprocessors, DSPs, or other digital processing circuitry, includes a control circuit 32 that is configured according to the teachings herein. The control circuit 32 also may be referred to as a processing circuit, a processing unit, or a control unit. In at least one embodiment, the control circuit 32 is specially adapted according to the network-side teachings herein, based on its execution of stored computer program instructions from a computer program 34 stored in the memory/storage 16.

The network node 10 may comprise a rack or cabinet of processing circuits using a card/backplane arrangement and may include a host of additional processing circuits/functions not shown in the simplified diagram. More generally, the processing circuit 14 may comprise any one or more computer-based circuits that control at least communication-related processing—e.g., transmit and receive operations through the RF interface circuitry 30. Thus, the processing circuit 14 may include a number of other functional circuits not shown, such as user-scheduling circuits to control uplink and/or downlink transmissions among a plurality of wireless devices 12 being supported by the network node 10, and may include one or more conditions-determination circuits, such as for determining network loading, e.g., for one or more served cells and/or one or more neighboring cells.

In a similar fashion, the wireless device 12 may be configured to operate according to any one or more wireless communication standards, such as the WCDMA and/or LTE and LTE-A standards. Broadly, the wireless device 12 may support more than one Radio Access Technology (RAT), such as may be used in heterogeneous network deployments involving macro cells and base stations and micro cells and base stations, where macro and micro base stations may or may not use the same RAT(s). The transceiver circuitry 20 therefore may comprise one or more cellular radios, and is shown overlapping the processing circuit 26 to indicate that the receiver 22 and/or transmitter 24 may be implemented in a mix of analog and digital circuits, including baseband processing circuits comprising or otherwise included in the processing circuit 26. In one such example, the processing circuit 26 implements one or more received signal processing chains that provide, for example, received signal linearization and/or interference compensation, symbol detection and corresponding decoding (Viterbi, joint detection, etc.), for the recovery of transmitted information.

A control circuit 36 is implemented within or as part of the processing circuit 26 of the wireless device and the memory/storage 28 in some embodiments stores one or more computer programs 38 and/or configuration data. The control circuit 36 carries out device-side processing regarding PRB set expansion, as taught herein. In at least one embodiment, the control circuit 36 is implemented based on the execution of computer program instructions by the processing circuit 26, where the program instructions are stored as a computer program 38 in the storage/memory 28, for example.

Figure 13:
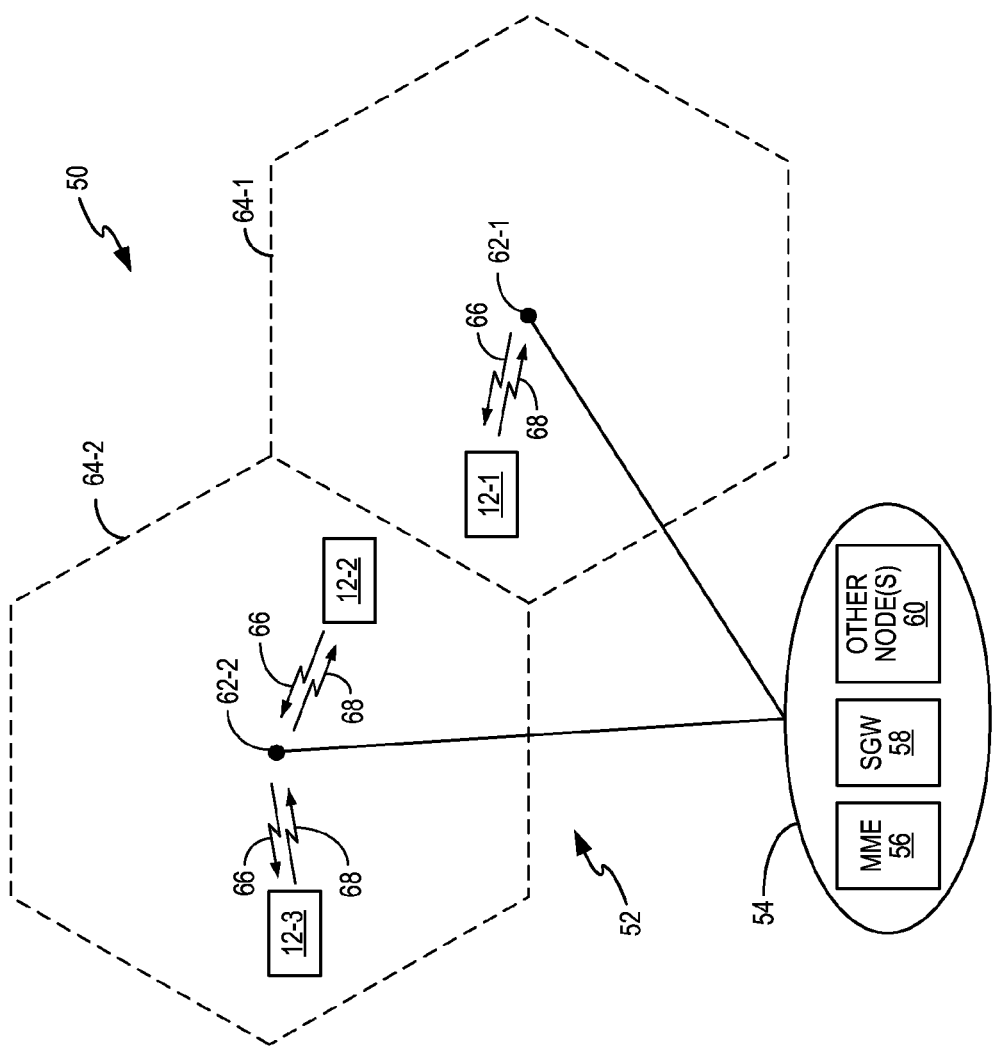
FIGS. 13 and 14 are block diagrams of example wireless communication network embodiments.

FIG. 13 illustrates a homogenous network example, where a wireless communication network 50 includes a Radio Access Network, RAN, 52 and a Core Network, CN, 54. The CN 54 includes a Mobility Management Entity or MME 56, a Serving Gateway or SGW 58, and one or more other nodes 60, such as positioning nodes, O&M nodes, OSS nodes, SON nodes, etc. In the example of FIG. 13, one or more of the base stations 62, which are eNodeBs in an LTE example, are configured to operate as the network node 10 described above.

Figure 14:
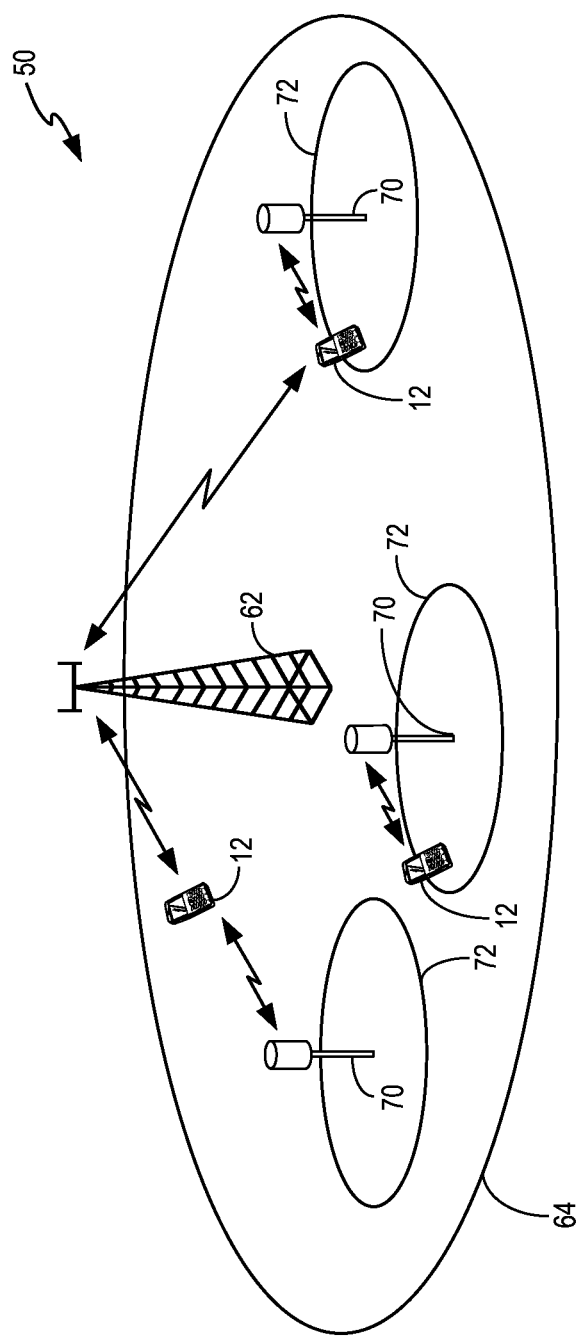

FIG. 14 illustrates another example embodiment, where the wireless communication network 50 is a heterogeneous network that includes a mix of "macro" cells 64 and "micro" cells 72. While the particular respective sizes of these cells 64, 72 are not fixed per se, macro cells 64 are characterized by their typically large sizes as compared to micro cells 72, which are also referred to as hotspots, pico cells, femto cells, etc. Further distinguishing macro and micro cells 64, 72, macro cells 64 typically are served by base stations 62 that operate at high transmission powers as compared to the low-power base stations 70 that serve the micro cells 72. Consequently, such base stations are often referred to as low-power nodes, LPNs, or access points, etc. The macro and micro cells 64 and 72 may be based on the same or on different RATs.

The macro base station 60 of FIG. 14 provides service in a corresponding macro cell 62. In turn, any one or more micro base stations 70 provide service in corresponding micro cells 72. In this example, the micro cells 72 overlay the macro cell 62 and thus may be regarded as hotspots which provide, e.g., enhanced data rate service and/or supplement the macro cell 62 with respect to coverage gaps within the geographic area corresponding to the macro cell 62. The network node 10 described above may be realized in the macro base station 60 and/or in the micro base stations 70.

Figure 15:
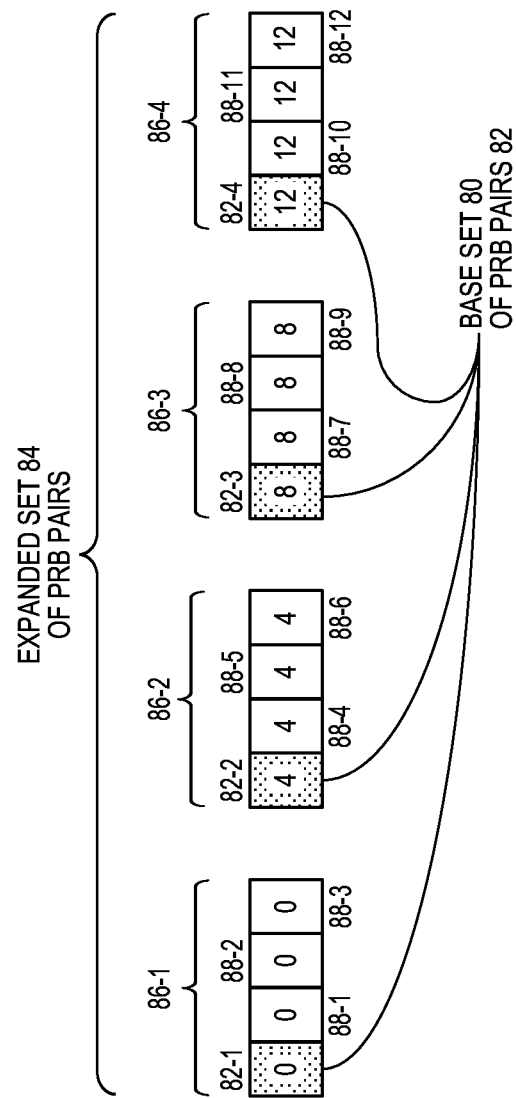
FIG. 15 is a block diagram illustrating one embodiment of an expanded set of PRB pairs, as obtained by inflating a base set of PRB pairs, for EPDCCH allocation in a constrained subframe.

Whether implemented as a macro base station 60, as a micro base station 70, or as another node type, the network node 10 contemplated herein is configured for operation in a wireless communication network 50 and comprises a communication interface 18 configured for communicating with wireless devices 12 operating in the network 50. With reference to FIG. 15, the example network node 10 further includes one or more processing circuits 14 configured to control EPDCCH processing with respect to constrained and unconstrained subframes.

In FIG. 15, one sees a base set 80 of N PRB pairs 82, where N=4. The base set 80 represents the nominal EPDCCH set to be used in an unconstrained subframe. In that regard, within an unconstrained subframe, each PRB pair 82 in the base set 80 offers a nominal number of REs for EPDCCH aggregation. However, in a constrained subframe, those same PRB pairs 82 have a reduced number of REs available for EPDCCH use. That is, the number of REs available for EPDCCH aggregation in each PRB pair 82 in the base set 80 is reduced in the constrained subframe, as compared to the number available in an unconstrained subframe.

Thus, for constrained subframes, the one or more processing circuit 14 of the network node 10 is characterized by being configured to expand the base set 80 of PRB pairs 82 in a given constrained subframe. The resulting expanded set 84 includes N groups 86 of PRB pairs 82, 88. Here, the reference numerals "82" and "88" both refer to PRB pairs, with the different reference numbers being used for clarity, to distinguish between the original PRB pairs included in the base set 80, and the PRB pairs added to form the expanded set 84.

Notably, the number of groups 86 in the expanded set 84 equals the number N of PRB pairs 82 in the base set 80, and each group 86 includes Q PRB pairs 82, 88. In particular, each group 86 includes one of the N original PRB pairs 82 in the base set 80, along with Q−1 additional PRB pairs 88. Thus, the expanded set 84 of PRB pairs 82, 88 includes a total of QN PRB pairs 82, 88.

Advantageously, with this approach to expansion, the number of ECCEs per subframe can remain unchanged in all subframes—that is, an expanded set 84 of PRB pairs 82, 88 in a constrained subframe can provide the same number of ECEEs as provided by the corresponding base set 80 of PRB pairs 82 in an unconstrained subframe. In turn, this feature greatly simplifies user-scheduling operations on the network side and simplifies reception and blind decoding on the device side, and keeps the EPDCCH capacity unchanged across any mix of constrained and unconstrained subframes. Hence, with the contemplated approach, the standardized formulas that define an ECCE remain unchanged and consist of a collection of L=4 or L=8 EREGs, respectively, in the nominal base set 80.

The processing circuit 14 of the network node 10 is further characterized with respect to their operation for constrained subframes by being configured to aggregate REs from each group 86 of PRB pairs 82, 88 in the expanded set 84 of PRB pairs 82, 88 into corresponding EREGs, and further to aggregate the EREGs into ECCEs, and to aggregate the ECCEs into one or more EPDCCHs, for transmission in the constrained subframe to one or more targeted wireless devices 12. Thus, the processing circuit 14 forms EPDCCHs from the base set 80 in an unconstrained subframe, and forms EPDCCHs from the expanded set 84 in a constrained subframe.

The processing circuit 14 in some embodiments is configured to generate the expanded set 84 of PRB pairs 82, 88 to include a total of Q×N PRB pairs 82, 88. Again, N is the integer number of PRB pairs 82 in the base set 30, and Q is an integer number representing an expansion factor. The expanded set 84 of PRB pairs 82, 88 therefore includes N groups 86 of Q PRB pairs 82, 88 per group 86. In at least one such embodiment, the processing circuit 14 is configured to select the additional PRB pairs 88 to include in the expanded set 84 according to a rule that specifies the additional PRB pairs 88 in terms of their logical position or indexing relative to the PRB pairs 82 in the base set 80. Further, in at least one embodiment of such selection processing, the processing circuit 14 is configured to select the additional PRB pairs 88 according to a position or index-based selection rule and to revert its selection to a next available index position within a defined bandwidth limit or constraint, if a next PRB pair selection would fall outside of the defined bandwidth limit or constraint.

In the particular example of FIG. 15, the expanded set 84 is formed by "repeating" the original PRB pairs 82 in the base set 80. That is, the base set 80 of PRB pairs 82 for the constrained subframe comprises N PRB pairs 82, and the processing circuit(s) 14 expands the base set 80 for the constrained subframe by repeating each one of the N PRB pairs 82 Q−1 times. By such repetition, the expanded set 84 of PRB pairs 82, 88 includes N groups 86 of Q PRB pairs 82, 88 in each such group 86. Each group 86 includes an original PRB pair 82 and Q−1 additional PRB pairs 88, where each additional PRB pair 88 is a repeat of the original PRB pair 82. Repeating a PRB pair 82 in this regard can be understood as using the same subset of REs in each repeated PRB pair 88 as are used by an EPDCCH candidate in the original, base PRB pair 82 being repeated.

Figure 16:
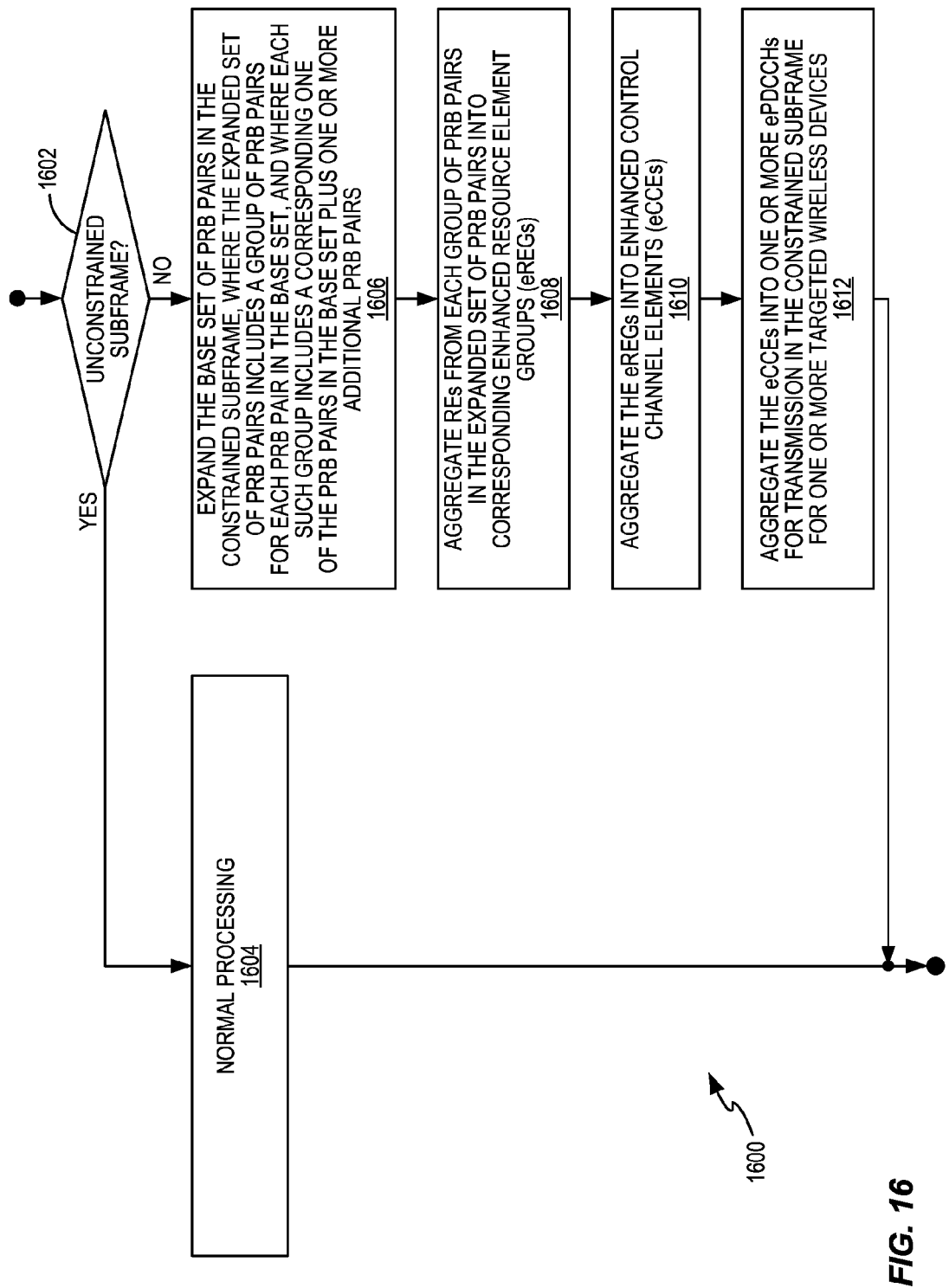
FIG. 16 is logic flow diagram of one embodiment of a method of processing at a network node, for EPDCCH set expansion as taught herein.

FIG. 16 illustrates a non-limiting example embodiment of a processing method 1600, which corresponds to the above-described processing for the network node 10. The method 1600 is directed to transmitting one or more EPDCCHs in a constrained subframe that, in comparison to an unconstrained subframe, has a reduced number of REs available for EPDCCH use in each PRB pair 82 within a base set 80 of PRB pairs 82 allocated for EPDCCH use. Correspondingly, the method 1600 "begins" with determining whether a subframe of interest is an unconstrained subframe or a constrained subframe.

For the case where the subframe is unconstrained, "YES" from Block 1602, "conventional" aggregation and EPDCCH processing is followed—"normal" aggregation processing in Block 1604. However, the method 1600 is characterized in that, for a constrained subframe—"NO" from Block 1602—it includes expanding (Block 1606) the base set 80 of PRB pairs 82 in the constrained subframe, to obtain an expanded set 84 of PRB pairs 82, 88 that includes a group 86 of PRB pairs 82, 88 for each PRB pair 82 in the base set 80. As explained before, each group 86 includes a corresponding one of the PRB pairs 82 in the base set 80, plus one or more additional PRB pairs 88. The method 1600 continues along this line of processing with aggregating (Block 1608) REs from each group 86 in the expanded set 84 into corresponding EREGs, aggregating (Block 1610) the EREGs into ECCEs, and aggregating (Block 1612) the ECCEs into the one or more EPDCCHs, for transmission in the constrained subframe to one or more targeted wireless devices 12. Of course, the method 1600 may be looped or otherwise repeated on an ongoing basis, over a dynamically changing mix of constrained and unconstrained subframes.

Figure 17:
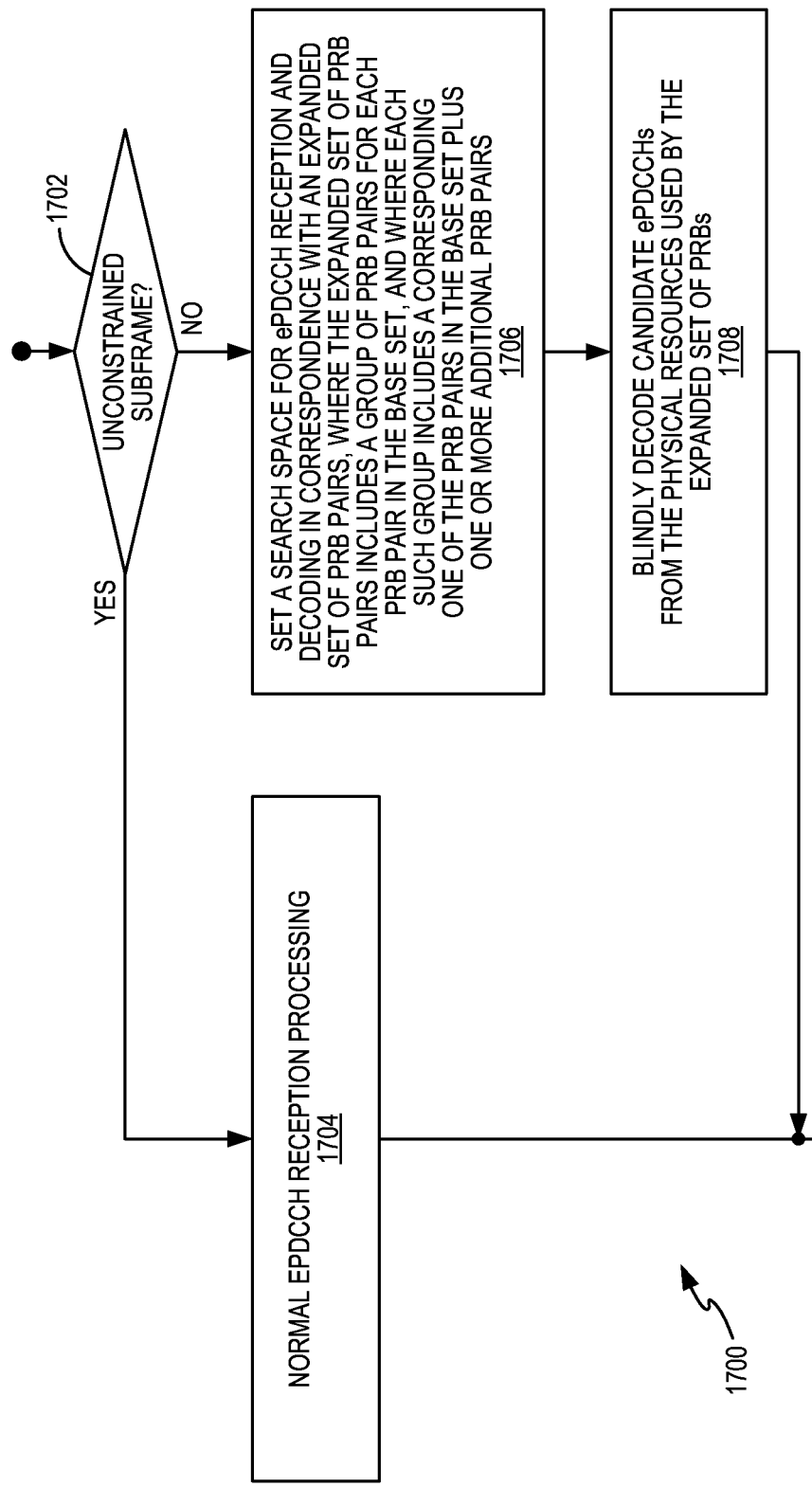
FIG. 17 is logic flow diagram of one embodiment of a method of processing at a wireless device, for blindly detecting EPDCCHs formed from an expanded set of PRB pairs in a constrained subframe.
Figure 22:
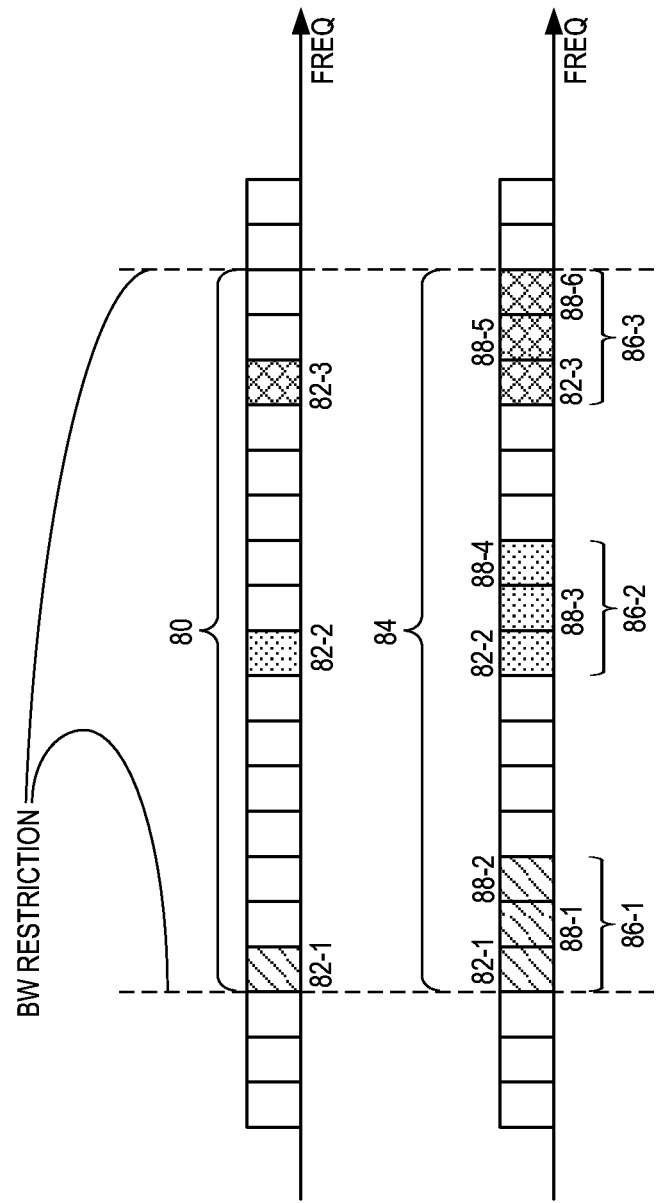
FIG. 22 is a diagram illustrating the expansion of a base set of PRB pairs according to a defined bandwidth restriction.

FIG. 17 illustrates an example of complementary device-side processing, as may be carried out by the wireless device 12 introduced in FIG. 11. The illustrated method 1700 includes determining whether the subframe of interest is a constrained subframe or an unconstrained subframe (Block 1702). If the subframe is unconstrained—"YES" from Block 1702—the wireless device 12 performs normal EPDCCH reception processing (Block 1704). This normal processing can be understood as including setting search spaces for EPDCCH reception in correspondence with the defined base set 80 of PRB pairs 82.

However, if the subframe is constrained—"NO" from Block 1702—the method 1700 is characterized by the wireless device 12 receiving a transmission from the wireless communication network 50 in which the 50 expanded a base set 80 of PRB pairs 82 for EPDCCH transmission in the constrained subframe. In that regard, the processing in method 1700 is characterized by the wireless device 12 setting (Block 1706) the search spaces for EPDCCH reception and decoding in correspondence with an expanded set 84 of PRB pairs 82, 88 that includes a group 86 of PRB pairs 82, 88 for each PRB pair 82 in the base set 80, plus one or more additional PRB pairs 88. The method 1700 therefore continues with the wireless device 12 blindly decoding (Block 1708) candidate EPDCCHs from the physical resources used by the expanded set 84 of PRB pairs 82, 88.

In some embodiments, the method 1700 includes the wireless device 12 determining the additional PRB pairs 88 according to a rule known to the wireless device 12. The rule is known from default configuration information, e.g., provisioned in the wireless device 12, or is known from signaled configuration information received from the wireless communication network 50, e.g., RRC signaling.

In an example of the expanded resources involved in blind detection of candidate EPDCCHs when an expanded set 84 of PRB pairs 82, 88 is in use, the base set 80 includes N PRB pairs 82 and the expanded set 84 includes N groups 86 of PRB pairs 82, 88. Each group 86 includes Q PRB pairs, including one of the original pairs from the base set 80 and Q−1 additional pairs. As previously noted, the Q−1 additional PRB pairs 88 in each group 86 may be "repeats" of the original PRB pair 82 included in that group 86 from the base set 80. In such embodiments, the wireless device 12 uses the search space for an EPDCCH candidate in an additional PRB pair 88 as used for the corresponding PRB pair 82 from which the additional PRB pair 88 is repeated.

With the method 1700 in mind, the processing circuit(s) 14 of the example wireless device 12 introduced in FIG. 11 may be configured to seamlessly perform EPDCCH detection and reception for normal base sets 80 of PRB pairs 82 and for expanded sets 84 of PRB pairs 82, 88, across any mix of constrained and unconstrained subframes. As previously detailed, the example wireless device 12 includes a communication interface 20 configured for communicating with one or more network nodes 10 in a wireless communication network 50, and a processing circuit 26 that is characterized by being configured to perform EPDCCH processing as taught herein with respect to constrained subframes. That is, for a constrained subframe having a reduced number of REs available for EPDCCH use in each PRB pair 82 within a base set 80 of PRB pairs 82 allocated for EPDCCH use, the processing circuit 14 is configured to: set the search space for EPDCCH reception and decoding in correspondence with an expanded set 84 of PRB pairs 82, 88, where the expanded set 82 of PRB pairs 82, 88 includes a group 86 of PRB pairs 82, 88 for each PRB pair 82 in the base set 80, and where each such group 86 includes a corresponding one of the PRB pairs 82 from the base set 80, plus one or more additional PRB pairs 88; and blindly decode candidate EPDCCHs from the physical resources used by the expanded set 84 of PRB pairs 82, 88.

The base set 80 of PRB pairs 82 may be the "RRC-configured" set of N PRB pairs 82 indicated to the wireless device 12, where the value N is fixed in every subframe. A wireless device 12 can, in Release 11, be configured with two base sets and the two sets could have different values of N. In Release 11, the possible values of N are 2, 4, and 8. In Release 12, if a common search space, CSS, is included, there may be an additional base set within the CSS. The value of N may remain a fixed number with respect to the CSS, with the value of N known by all wireless devices 12 connected to the network node 10.

FIGS. 18 and 19 assume that the depicted subframes are constrained and therefore have a shortened or abbreviated portion for DMRS/EPDCCH usage. In this context, FIG. 18 illustrates an advantageous approach to inserting DRMS within the beginning region of the subframe, and FIG. 19 illustrates that such an arrangement leaves at most two REs per PRB pair, which exemplifies the earlier-described reduction in EPDCCH resources available in constrained subframes. In more detail, the index numbers in the RE tiles shown in FIG. 19 represent corresponding EREG memberships, and one sees that each EREG will at most have two REs available for EPDCCH usage. In another, similar arrangement contemplated herein, DMRS for EPDCCH are inserted into the first two OFDM symbols of the subframe, instead of the second and third symbols, as is done in the examples of FIGS. 18 and 19. EREG mapping would, of course, be adjusted correspondingly.

Considering these and other examples, it is contemplated herein that, for a given subframe where there is an EPDCCH resource problem, DMRS antenna ports are made present—i.e., inserted into the abbreviated portion of the subframe which can be used for DMRS transmission—and a base set 80 of N PRB pairs 82 allocated for EPDCCH use is inflated to consist of QN PRB pairs 82, 88. Inflation, also referred to as expansion, is achieved by repeating each PRB pair 82 in the base set 80 Q−1 times. Thus, for each PRB pair 82 in the base set 80, there are Q−1 additional PRB pairs 88. Hence, if the ECCE definition is known for a nominal subframe where N PRB pairs 82 are used, the same ECCE definition holds in subframes using inflation, but each RE is repeated Q times overall—such as was suggested in the example of FIG. 15.

Correspondingly, a wireless device 12 monitors a certain set of REs for a candidate EPDCCH in a nominal PRB pair 82 when inflation is not in use, and, when inflation is in use, the wireless device 12 additionally monitors the same REs in each of the Q−1 additional PRB pairs 88 associated with each nominal PRB pair 82. For the example of FIG. 15, the inflation factor Q equals 4, and each group 86 in the expanded set 84 is formed by selecting the three adjacent PRB pairs 88 with increasing PRB index. Further, in the illustrated example, in the original PRB pair 82-1 EREG#0 is used by an ECCE, and as such the same EREG#0 is used in each one of the additional PRB pairs 88-1, 88-2 and 88-3 included in the same group 86-1.

If a fixed, predefined relationship is used to determine the additional PRB pairs 88 used to obtain the expanded set 84, then the network 10 need not signal the composition of the expanded set 84 to the wireless device 12, as the wireless device 12 can be configured to follow the fixed relationship defining the set expansion. In an example case, each original PRB pair 82 in a base set 80 is inflated by adding the adjacent Q−1 PRB pairs 88 to it, using increasing RB index relative the original PRB pair 82.

FIG. 20A illustrates an example base set 80 that includes original PRB pairs 82-1, 82-2, and 82-3. FIG. 20B illustrates one embodiment of expansion, where there are three groups 86-1, 86-2 and 86-3 of PRB pairs 82, 88. Each pair includes one of the original PRB pairs 82-1, 82-2 and 82-3 and two successively higher indexed additional PRB pairs 88. In a generalization of this example, a PRB pair 82 with index y is inflated to form a group 86 containing the PRB pair 82 with index y, and one or more additional PRB pairs 88 with indices y+1, . . . , y+Q−1.

FIG. 20C illustrates an example of another embodiment, where a nominal PRB pair 82 is inflated by annexing adjacent Q−1 PRB pairs, but where the additional pairs are taken from both sides of the base pair—i.e., with increasing and decreasing PRB indexes. In a generalization of this approach, a PRB pair 82 with index y is inflated to form a group 86 that contains that PRB pair 82 and one or more additional PRB pairs 88 with indices y−floor(Q/2) to y−1 on one side of the PRB pair 82, and with indices y+1 to y+ceil(Q/2)−1 on the other side of the PRB pair 82.

As suggested in FIG. 20C in at least one embodiment, the additional or inflated PRB pairs 88 are first selected within the resource block group or RBG of the corresponding nominal PRB pairs 82, and then in adjacent RBGs. In another embodiment, the Q−1 additional PRB pairs 88 included in each the N groups 86 in the expanded set 84 are selected per nominal PRB pair 82, according to a predetermined order as exemplified above, starting with one of the nominal PRB pairs 82. However, if a PRB pair 88 is selected more than once according to the rule, an exception is made by selecting the closest available PRB pair instead. Further, the additional PRB pairs 88 to be included in each group 86 of the expanded set 84 can be selected in an order based on the nominal PRB pair index, or by selecting the whole group of Q−1 additional PRB pairs 88 for each nominal PRB pair 82 at a time, or by selecting them in an interleaved fashion. In an example of interleaved selection, the first additional PRB pair 88 is selected for all N groups 86 in the expanded set 84, then the next additional PRB pair 88 is selected for all groups 86, and so on.

For ease of discussion regarding the below pseudo code examples, reference numbers are not used within the pseudo code examples themselves, but the phrase "nominal EPDCCH PRB pairs" may be understood to be the original PRB pairs 82 in a configured base set 80.

Pseudo code to implement an example algorithm is given below:

```
Set q=1
  While q <= Q-1
    Set n=1
    While n <= N
      Given the nominal PRB pair S(n) of the nominal set S,
      find and allocate nearest available PRB pair within the
      RBG, if none available find nearest outside RBG.
      Increment n by 1
    End while
    Increment q by 1
End while
```

In another embodiment, the additional PRB pairs 88 are selected so that they are grouped into units that fill up an RBG and if multiple RBGs are needed, they are evenly spread out in the PRB pair space between two RBGs containing original PRB pairs 82 from the base set 80. Variations of this approach are shown in FIGS. 20D and 21F. FIG. 21A shows a starting, nominal set 80 of PRB pairs 82-1, 82-2, 82-3 and 82-4, and FIGS. 21B-21F show various approaches for inflating the base set 80 into an expanded set 84 that includes N groups 84. Note that the embodiment in FIG. 21F increases frequency diversity among the PRBs included in the expanded set 84 of PRBs 82, 88.

An exemplifying algorithm for the embodiments in FIG. 20-D and FIG. 21-F is written in pseudo code below.

```
Set q=1
  While q <= Q-1
    Set n=1
    While n <= N
      Let R(m) be the sequence of PRB pairs that are the first PRB pairs
      in RBGs containing nominal EPDCCH PRB pairs; The last
      element of R(m) is N_PRB+1 where N_PRB is the number of
      PRBs on the carrier.
      Given the nominal PRB pair S(n) of the nominal set S in RBG
      R(m), find and allocate nearest available PRB pair within the RBG
      R(m); if none available find next outside RBG at a distance of D
      PRB pairs from S(n) where
        D = (R(m+1) - R(m)) / K, where
        K = ceil( (Q-1) / RBG_size).
      Increment n by 1
    End while
    Increment q by 1
End while
```

In some embodiments, a group of consecutive M PRB pairs 82 comprising a nominal EPDCCH set—a base set 80—is inflated by adding adjacent M×(Q−1) PRB pairs 88 with increasing RB index relative to each nominal PRB pair

82. The M consecutive PRB pairs 82 with indices y, y+1, y+M−1 are inflated to contain an expanded set 84 of PRB pairs 82, 88, with indices y, y+1, y+M×(Q−1)−1. In one example case, the nominal PRB pair 82 with index y+m, where 0≤m≤M−1, is inflated to contain additional PRB pairs 88 with indices y+m, y+m+M, . . . y+m+M×Q−1. In yet another example, the nominal PRB pair 82 with index y+m, where 0≤m≤M−1, is inflated to contain additional PRB pairs 88 with indices y+m×M, y+m×M+1, y+(m+1)×M−1. As a variation of this second approach, a nominal PRB pair 82 is inflated by annexing adjacent M×(Q−1) PRB pairs 88 located on both sides of the nominal PRB pair 82—i.e., using additional PRB pairs 88 of increasing and decreasing PRB index.

In yet another example, the nominal PRB pair 82 with index y+m, where 0≤m≤M−1, is inflated to contain additional PRB pairs 88 with indices y+m−M×floor(Q/2), y+m, y+m+M×(ceil(Q/2)−1). Still further, in another example, the nominal PRB pair 82 with index y+m, where 0≤m≤M−1, is inflated to contain additional PRB pairs 88 with indices y+Q×(m−floor(M/2)), . . . , y+Q×(m−floor(M/2))−1.

In a further example embodiment, the bandwidth within which the inflation of the base set 80 is performed is limited to a given size, indicated as $N_{inflate}$. In an example case, such as shown in FIG. 20, the network 50 configures this bandwidth to be of a certain size. Alternatively the bandwidth can be defined to be the system bandwidth on which the wireless device 12 operates on in the downlink. Note that if the network 50 configures the bandwidth for set expansion according to a defined bandwidth limit or constraint, the network 50 can also configure the location of the restriction, or the location can be derived from the location(s) of the PRB pairs 82 in the base set 80, e.g., as starting at the lowest index PRB pair in the nominal set 80.

The inflation together with a bandwidth size restriction affects the location of the PRB pair in each end of the allocation area, i.e., in both the higher end and the lower end. If the expansion algorithm in use would otherwise select an additional PRB pair 88 for inclusion in the expanded set 84 that is beyond the upper bandwidth limit, the next-highest index that falls within the upper bandwidth limit is assigned. Similarly, if a PRB pair selection falls below the lower bandwidth limit, then selection reverts to the next-lowest PRB pair index that is within such limit.

PRB pair "collisions" are also accommodated in the teachings herein. That is, different PRB pairs may collide when expansion is performed. If a collision occurs, the groups 86 can be prioritized. For example, a given group 86 can be assumed to have priority with respect to retaining the mapping between EREG and ECCE. The prioritized group 86 could for example be the group 86 that contains the original PRB pair 82 having the lowest index or the highest index. It could also be the group 86 that contains the original PRB pair 82 having the lowest number of REs in the EREGs assigned for EPDCCH use.

Now consider dynamic adjustments of the aggregation levels across a mixture of consecutive and nonconsecutive PRB pairs. In problematic subframes—i.e., constrained subframes—the number of available REs per base PRB pair 82 is a small number "X". If inflation with a factor Q as taught herein is applied, then the number of available REs per ECCE can be enough to support aggregation level 1, AL=1. Hence, the number X of available REs in a given base PRB pair 82 within the constrained subframe can be inflated over all Q PRB pairs 82, 88 in the corresponding group 86, so that X'=QX, and where the aggregation levels used for ECCE/EPDCCH are adjusted according to X', with respect to a threshold X_thresh.

For example, consider an original PRB pair 82 in a base set 80 that offers 24 REs within the constrained subframe, i.e., X=24. That value is below the legacy value of X_thresh=104. However, using an inflation factor Q=6, X'=144 RE for the corresponding group 86 of PRB pairs 82, 88. As X' exceeds X_thresh=104, any of the defined aggregation levels, AL=[1, 2, 4, 8, 16], can be used for EPDCCH monitoring of the search space by the wireless device 12, despite the number X of available REs per original PRB pair 82 in the base set 80 being very low.

In some embodiments contemplated herein, the value of the inflation factor Q is independently configured per each nominal base set 80 of PRB pairs 82. Here, it is observed that a large base set 80 needs less inflation than a smaller base set 80. Making the configuration of Q independent between sets 80 advantageously saves control-signaling overhead. A large base set 80 could also have a different limitation in the maximum possible value allowed for Q, as compared to that allowed for a smaller set 80. The limitation on Q may also depend on the total system bandwidth of the carrier the wireless device 12 is operating on. Thus, Q can be set to ensure that enough PRB pairs will be available for inflation in shorter subframes.

It is also contemplated in some embodiments to set Q per subframe type. For example, it was noted that both MBSFN subframes and TDD special subframes are problematic. Thus, in some embodiments, two values of Q are configured, possibly per base set 80, for these two types of subframes, respectively. For instance, a larger value of Q may be used in MBSFN subframes as compared to the value of Q used for expansion in special subframes. Such an arrangement reflects the fact that MBSFN subframes have comparatively fewer REs available for EPDCCH use.

In these and in other example embodiments, RRC or other signaling may be used to configure the value of Q. Alternatively, the value(s) of Q may be specified or otherwise predefined and stored as configuration data in the network 50 and in wireless devices 12. For example, a table or logic rule can be provided by specification that gives the value Q as a function of, for instance, the value of N defining the size of the base set 80, as a function of the number of OFDM symbols available for EPDCCH use within the constrained subframe, as a function of whether the EPDCCH carries the CSS or a device-specific search space, and/or as a function of the system bandwidth of the carrier the wireless device 12 operates on.

In an example embodiment, the value of Q for EPDCCH carrying the CSS is provided by specification, while the Q value for an EPDCCH that carries a device-specific search space is configured via RRC signaling. This approach will be appreciated if one recognizes that the CSS contains broadcast messages and the same Q value needs to be known to all wireless devices 12 monitoring the CSS in the given network cell, and it is preferable therefore that the common value of Q be known without need for RRC configuration.

Another aspect of the teachings herein consider "bundling". Because the number of DMRS in constrained subframes is limited, DMRS-based channel estimation performance is degraded in comparison to that achievable in unconstrained subframes. Hence, there may be "coverage" variation as a function of subframe type—i.e., DMRS-based reception performance at a given wireless device 12 may be degraded in a constrained subframe. Thus, in some embodiments contemplated herein, PRB "bundling" is used over the Q PRB pairs 82, 88 included in each group 86 in an expanded set 84. Thus, when performing channel estimation for receiving EPDCCH in a subframe where inflation is used, the wireless device 12 assumes bundling of the Q PRB pairs 82, 88 associated with each nominal PRB pair 82. Here, "bundling" means that the same precoding is used by the network node 10 over the group 86 of Q PRB pairs 82, 88, and the wireless device 12 therefore can safely interpolate channel estimates across resource block boundaries but within the Q PRB pairs. However, bundling across PRB pairs belonging to different groups 86 within the expanded set 84 is not used, because the network node 10 may use different precoding vectors for different groups 86.

Figure 23:
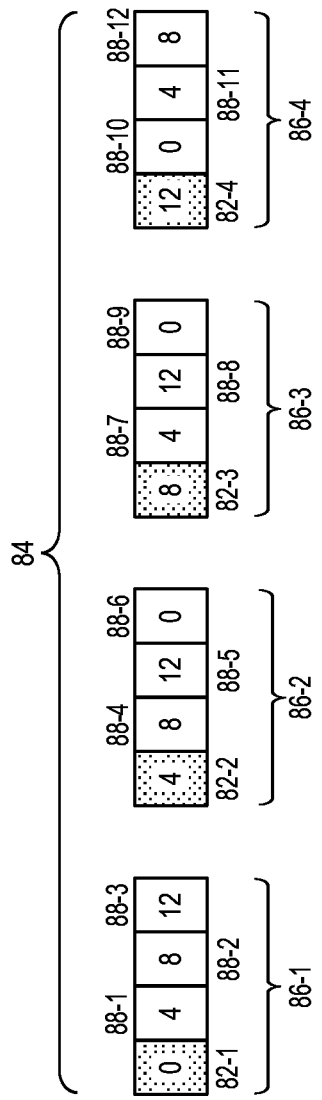
FIGS. 23 and 24 are diagrams illustrating the permuation of EREGs within PRB pair groupings in an expanded set of PRB pairs, for enhancing the frequency diversity of the EREGs used to form ECCEs from the expanded set.
Figure 24:
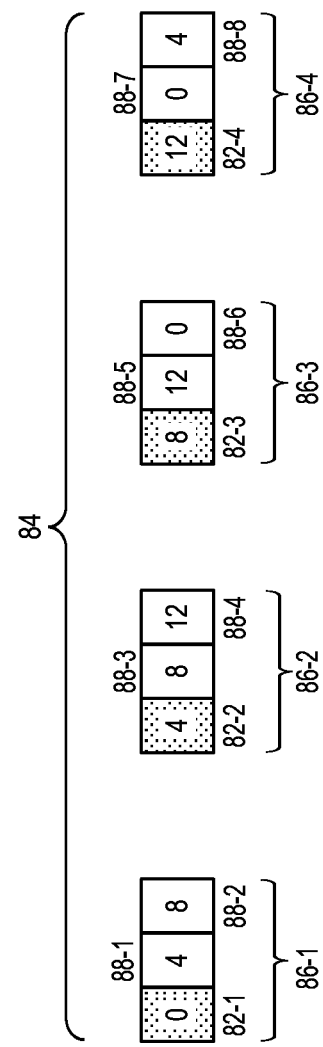

FIGS. 23 and 24 illustrate another aspect of the teachings herein, addressing the issue of frequency diversity. For context, refer momentarily back to FIG. 19, in which one sees that EREGs 0-7 have two REs per PRB pair, while EREGs 8-15 have one RE/PRB pair. Hence, in the inflation illustrated in FIG. 15, an ECCE will have fewer REs in one half of the N groups 86 of PRB pairs 82, 88 in the expanded set 84, as compared to the other half. This fact reduces frequency diversity in cases where the groups 86 are configured to maximize frequency diversity based on maximum group separation. Thus, in some embodiments herein, expansion processing is adapted to ensure that an ECCE has roughly an equal number of REs in each bandwidth part, for optimal frequency diversity. In an example case, the inflated PRB pairs 88 are permuted, for instance cyclically as shown in FIGS. 23 and 24.

In FIG. 23, the first inflated group 86-1 of PRB pairs 82, 88 contains the EREGs indexed 0, 4, 8 and 12 which have 2, 2, 1 and 1 available REs respectively. An ECCE that combines EREGs 0, 4, 8, and 12 will thus have 6 REs per group 86 of Q PRB pairs 82, 88 in the expanded set 84. In particular, FIG. 23 depicts an example where the number N of PRB pairs 82 in the base set 80 is four and the inflation factor Q is four, so that there are four groups 86 of PRB pairs 82, 88 in the expanded set 84, numbered as 86-1, 86-2, 86-3 and 86-4. Each group 86 includes a permutation of EREGs, to balance the REs available per group. As can be seen in this example, the second inflated group 86-2 is a cyclic shift of the EREG from the first group and so on. FIG. 24 depicts another permutation example, where N=4 and Q=3 where in the first inflated group EREG 12 is not used and in the second inflated group EREG 0 is not used and so on, so that the unused EREG is balanced among the groups.

Yet another embodiment uses an alternative EREG definition for the expanded set 84 of PRB pairs 82, 88. Here, as an alternative to address the above cited frequency diversity issues, alternative EREG numbering is disclosed. In a normal, unconstrained subframe, the physical resources of a base PRB pair 82 are divided into 16 EREGs. In a subframe where an EPDCCH inflation factor of Q is used, the physical resources of Q PRB pairs 82, 88 are divided into 16 EREGs. Hence, the total number of EREGs remains the same irrespective for the inflated and the non-inflated case, but in one alternative embodiment, the REs from each group 86 of the PRB pairs 82, 88 are assigned to the EREGs on a PRB-by-PRB order. The assignment within each PRB pair 82, 88 is made first with respect to frequency and second with respect to time. After all resources are assigned for a given one of the PRB pairs 82, 88, the assigning continues for the next PRB pair 82, 88 in the group 86. See FIGS. 25A and 25B for an example illustration.

Figure 26B:
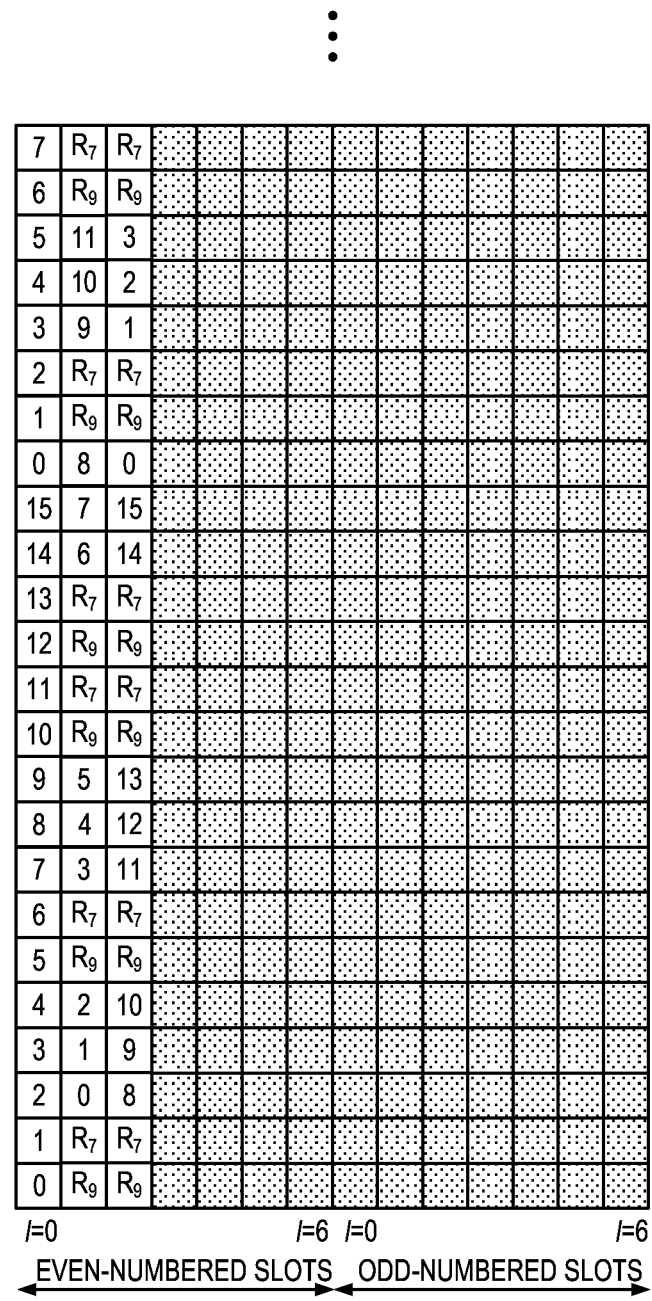

As an alternative, the REs for each group 86 of PRB pairs 82, 88 are assigned to the EREGs first according to frequency across all Q PRB pairs 82, 88, and then according to time. Both such embodiments provide for a more even distribution of REs among the EREGs. See FIGS. 26A and 26B for an example of this alternative approach, and it should be noted again that, in general, the PRB pairs 82, 88 included in any given one of the N groups 86 in the inflated set 84 may or may not have consecutive RB indices.

It is also contemplated to condition or control inflation as a function of set type. For example, inflation according to any of the previous embodiments is performed only for base sets 80 of localized type, or only for base sets 80 of distributed type. For example, for constrained subframes arising due to MBSFN or TDD configurations, inflation is performed only for base sets 80 of distributed type and such inflation is not performed for base sets 80 of localized type. In another embodiment, inflation may be performed for base sets 80 of the localized type, but they may be treated as another distributed set, where it is assumed that the same precoder is used for all PRBs 82, 88 in each group 86 in the expanded set 84.

With the above examples in mind, the teachings herein provide the ability to define EPDCCH for constrained subframes where only a few OFDM symbols are available for downlink transmission and do so without requiring substantive changes to EPDCCH implementation, as compared to EPDCCH in a normal, unconstrained subframe. This technique thus allows for scheduling to be done in constrained subframes, in particular for the uplink, and allows for cross-carrier scheduling on another aggregated carrier in Carrier Aggregation or CA embodiments.

It should also be noted that while the wireless device 12 described herein may be referred to as a "UE" according to 3GPP terminology, it should be broadly understood as essentially any wireless apparatus configured according to the teachings herein. Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a network node operating in a wireless communication network, said method including transmitting one or more Enhanced Physical Downlink Control Channels, EPDCCHs, in a constrained subframe that, in comparison to an unconstrained subframe, has a reduced number of Resource Elements, REs, available for EPDCCH use in each Physical Resource Block, PRB, pair within a base set of PRB pairs allocated for EPDCCH use, and wherein the method comprises:

expanding the base set of PRB pairs in the constrained subframe, to obtain an expanded set of PRB pairs that includes a group of PRB pairs for each PRB pair in the base set, and where each such group includes a corresponding one of the PRB pairs in the base set, plus one or more additional PRB pairs;

aggregating REs from each group of PRB pairs in the expanded set of PRB pairs into corresponding enhanced Resource Element Groups, EREGs;

aggregating the EREGs into enhanced Control Channel Element, ECCEs; and aggregating the ECCEs into the one or more EPDCCHs, for transmission in the constrained subframe to one or more targeted wireless devices.

2. The method of claim 1, further comprising generating the expanded set of PRB pairs to include Q×N PRB pairs, where N is the integer number of PRB pairs in the base set, and where Q is an integer number representing an expansion factor, and where the expanded set of PRB pairs includes N groups of Q PRB pairs per group.

3. The method of claim 1, further comprising selecting the additional PRB pairs to include in the expanded set according to a rule that specifies the additional PRB pairs in terms of their logical position or indexing relative to the PRB pairs in the base set.

4. The method of claim 1, further comprising selecting the additional PRB pairs according to a position or index-based selection rule that reverts to a next-available index position within a defined bandwidth limit or constraint, if a next PRB pair selection falls outside of the defined bandwidth limit or constraint.

5. The method of claim 1, wherein the base set of PRB pairs for the constrained subframe comprises N PRB pairs, and wherein the method further comprises expanding the base set of PRB pairs for the constrained subframe by repeating each one of the N PRB pairs Q−1 times, such that the expanded set of PRB pairs includes N groups of Q PRB pairs in each such group, and such that each one of the N groups includes one of the N PRB pairs from the base set of PRB pairs and Q−1 repeated PRB pairs.

6. The method of claim 5, wherein each given one of the N PRB pairs in the base set of PRB pairs is repeated by repeating a same subset of the REs in each of the Q−1 additional PRB pairs included in the corresponding group in the expanded set, as is used by a corresponding EPDCCH candidate in the PRB pair being repeated.

7. The method of claim 1, wherein the REs from each group of PRB pairs in the expanded set of PRB pairs are assigned to the EREGs first according to frequency across all PRB pairs in the group, and then according to time.

8. The method of claim 1, wherein the REs forming each group of the PRB pairs in the expanded set of PRB pairs are assigned to the EREGs on a PRB-by-PRB order, wherein the assignment within each PRB pair is made first with respect to frequency and second with respect to time and wherein, after all REs are assigned for a given one of the PRB pairs, resource assignment continues with the next PRB pair in the group.

9. A network node configured for operation in a wireless communication network, said network node comprising:
a communication interface configured for communicating with wireless devices operating in the wireless communication network; and
one or more processing circuits that are configured to control enhanced Physical Downlink Control Channel, EPDCCH, processing with respect to constrained and unconstrained subframes, wherein, in comparison to unconstrained subframes, constrained subframes have a reduced number of Resource Elements, REs, available for EPDCCH use in each Physical Resource Block, PRB, pair within a base set of PRB pairs allocated for EPDCCH use, and further wherein, for constrained subframes
said one or more processing circuits further configured to:
expand the base set of PRB pairs in a given constrained subframe, to obtain an expanded set of PRB pairs that includes a group of PRB pairs for each PRB pair in the base set, and where each such group includes a corresponding one of the PRB pairs in the base set, plus one or more additional PRB pairs;
aggregate REs from each group of PRB pairs in the expanded set of PRB pairs into corresponding enhanced Resource Element Groups, EREGs;
aggregate the EREGs into enhanced Control Channel Elements, ECCEs; and
aggregate the ECCEs into one or more EPDCCHs, for transmission in the constrained subframe to one or more targeted wireless devices.

10. The network node of claim 9, wherein the processing circuit is configured to generate the expanded set of PRB pairs to include Q×N PRB pairs, where N is the integer number of PRB pairs in the base set, and where Q is an integer number representing an expansion factor, and where the expanded set of PRB pairs includes N groups of Q PRB pairs per group.

11. The network node of claim 9, wherein the processing circuit is configured to select the additional PRB pairs to include in the expanded set according to a rule that specifies the additional PRB pairs in terms of their logical position or indexing relative to the PRB pairs in the base set.

12. The network node of claim 9, wherein the processing circuit is configured to select the additional PRB pairs according to a position or index-based selection rule that reverts to a next-available index position within a defined bandwidth limit or constraint, if a next PRB pair selection falls outside of the defined bandwidth limit or constraint.

13. The network node of claim 9, wherein the base set of PRB pairs for the constrained subframe comprise N PRB pairs, and wherein the processing circuit expands the base set of PRB pairs for the constrained subframe by repeating each one of the N PRB pairs Q−1 times, such that the expanded set of PRB pairs includes N groups of Q PRB pairs in each such group, and such that each one of the N groups includes one of the N PRB pairs from the base set of PRB pairs.

14. The network node of claim 13, wherein the processing circuit is configured to repeat each given one of the N PRB pairs in the base set of PRB pairs by using the same subset of the REs in each one of the Q−1 additional PRB pairs in the corresponding group, as are used by an EPDCCH candidate in the PRB pair being repeated.

15. The network node of claim 9, wherein the REs from each group of PRB pairs in the expanded set of PRB pairs are assigned by the processing circuit to the EREGs first according to frequency across all PRB pairs in the group, and then according to time.

16. The network node of claim 9, wherein the REs forming each group of the PRB pairs in the expanded set of PRB pairs are assigned by the processing circuit to the EREGs on a PRB-by-PRB order, wherein the assignment within each PRB pair is made first with respect to frequency and second with respect to time and wherein, after all REs are assigned for a given one of the PRB pairs, resource assignment continues with the next PRB pair in the group.

17. A method of Enhanced Physical Downlink Control Channel, EPDCCH, processing in a wireless device operating in a wireless communication network that operates with constrained and unconstrained subframes, said method comprising:
receiving a transmission from the wireless communication network in a constrained subframe in which the wireless communication network expanded a base set of Physical Resource Block, PRB, pairs for EPDCCH transmission in the constrained subframe, and wherein in the constrained subframe the PRB pairs in the base set have fewer REs available for EPDCCH use, as compared to an unconstrained subframe;

setting a search space for EPDCCH reception and decoding in the constrained subframe in correspondence with an expanded set of PRB pairs that includes a group of PRB pairs for each PRB pair in the base set, and where each such group includes a corresponding one of the PRB pairs in the base set plus one or more additional PRB pairs; and blindly decoding candidate EPDCCHs from the physical resources used by the expanded set of PRB pairs.

18. The method of claim 17, further comprising determining the additional PRB pairs according to a rule known to the wireless device.

19. The method of claim 18, wherein the rule is known from default configuration information or signaled configuration information received from the wireless communication network.

20. The method of claim 17, wherein there are N PRB pairs in the base set of PRB pairs allocated for EPDCCH use in the constrained subframe, and wherein the expanded set of PRB pairs includes N groups of Q PRB pairs in each group, and further where each one of the N groups of PRB pairs includes one of the PRB pairs from the base set of PRB pairs, referred to as a base PRB pair, and Q−1 additional PRB pairs.

21. The method of claim 20, wherein each one of the Q−1 additional PRB pairs in each one of the N groups of PRB pairs in the expanded set is a repeated pair with respect to the base PRB pair in the group, such that the wireless device sets the search space for an EPDCCH candidate for each repeated PRB pair the same as it sets for the corresponding base PRB pair.

22. A wireless device configured for operation in a wireless communication network that operates with constrained and unconstrained subframes, said wireless device comprising:

a communication interface configured for communicating with one or more network nodes in the wireless communication network, and one or more processing circuits that are operatively associated with the communication interface and configured to:

receive a transmission from the wireless communication network in a constrained subframe in which the wireless communication network expanded a base set of Physical Resource Block, PRB, pairs for EPDCCH transmission in the constrained subframe, wherein in the constrained subframe the PRB pairs in the base set have fewer REs available for EPDCCH use, as compared to an unconstrained subframe;

set a search space for EPDCCH reception and decoding for the constrained subframe in correspondence with an expanded set of PRB pairs, where the expanded set of PRB pairs includes a group of PRB pairs for each PRB pair in the base set, and where each such group includes a corresponding one of the PRB pairs in the base set plus one or more additional PRB pairs; and blindly decode candidate EPDCCHs from the physical resources used by the expanded set of PRB pairs.

23. The wireless device of claim 22, wherein the one or more processing circuits are configured to determine the additional PRB pairs according to a rule known to the wireless device.

24. The wireless device of claim 23, wherein the rule is known from default configuration information or signaled configuration information received from the wireless communication network.

25. The wireless device of claim 22, wherein there are N PRB pairs in the base set of PRB pairs, and wherein the expanded set of PRB pairs includes N groups of Q PRB pairs in each group, and further wherein each one of the N groups of PRB pairs includes one of the PRB pairs from the base set of PRB pairs, referred to as a base PRB pair, and further includes Q−1 additional PRB pairs.

26. The wireless device of claim 25, wherein each one of the Q−1 additional PRB pairs in each one of the N groups of PRB pairs in the expanded set is a repeated pair with respect to the base PRB pair in the group, such that the wireless device sets the search space for an EPDCCH candidate in a repeated PRB pair the same as used for the corresponding base PRB pair.

* * * * *